US011030104B1

(12) United States Patent
Gupta et al.

(10) Patent No.: US 11,030,104 B1
(45) Date of Patent: Jun. 8, 2021

(54) PICKET FENCE STAGING IN A MULTI-TIER CACHE

(71) Applicant: International Business Machines Corporation, Armonk, NY (US)

(72) Inventors: Lokesh Mohan Gupta, Tucson, AZ (US); Kevin J. Ash, Tucson, AZ (US); Kyler A. Anderson, Sahuarita, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/748,665

(22) Filed: Jan. 21, 2020

(51) Int. Cl.
*G06F 12/0862* (2016.01)
*G06F 12/0897* (2016.01)

(52) U.S. Cl.
CPC ...... *G06F 12/0862* (2013.01); *G06F 12/0897* (2013.01); *G06F 2212/225* (2013.01); *G06F 2212/604* (2013.01)

(58) Field of Classification Search
CPC .................................................. G06F 12/0862
USPC .......................................................... 711/122
See application file for complete search history.

(56) References Cited

U.S. PATENT DOCUMENTS

| | | | |
|---|---|---|---|
| 6,516,384 B1 * | 2/2003 | Clark ................... | G06F 12/126 711/109 |
| 8,700,854 B2 | 4/2014 | Ash et al. | |
| 9,069,678 B2 | 6/2015 | Benhase et al. | |
| 9,128,847 B2 | 9/2015 | Ito et al. | |
| 9,811,276 B1 | 11/2017 | Taylor et al. | |
| 10,210,084 B1 | 2/2019 | Bruce et al. | |
| 2005/0066151 A1 * | 3/2005 | Kottapalli ........... | G06F 9/30072 712/226 |
| 2012/0110259 A1 * | 5/2012 | Mills ..................... | G06F 3/0685 711/113 |

* cited by examiner

*Primary Examiner* — Jae U Yu
(74) *Attorney, Agent, or Firm* — Konrad, Raynes, Davda and Victor LLP; William K. Konrad

(57) ABSTRACT

Provided are a computer program product, system, and method for queuing prestage requests in one of a plurality of prestage request queues as a function of the number of track holes determined to be present in a track cached in a multi-tier cache. A prestage request when executed prestages read data from storage to a slow cache tier of the multi-tier cache, for one or more sectors identified by one or more track holes. In another aspect, allocated tasks are dispatched to execute prestage requests queued on selected prestage request queues as a function of priority associated with each prestage request queues. Other aspects and advantages are provided, depending upon the particular application.

18 Claims, 10 Drawing Sheets

PICKET FENCE STAGING IN A MULTI-TIER CACHE

BACKGROUND OF THE INVENTION

1. Field of the Invention

The present invention relates to a computer program product, system, and method for picket fence staging in a multi-tier cache.

2. Description of the Related Art

A storage system typically includes a storage controller and one or more data storage units or devices (often referred to simply as "storage") such as hard disk drives, solid state drives, tape drives, etc. The storage system is often connected to a host with hosts applications which issue input/output instructions or commands for writing data to or reading data from a storage subunit such as a track or volume, for example.

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Data from a host to be stored in the data storage system is typically directed to a primary data storage device at a local site and then replicated to one or more secondary data storage devices which may be geographically remote from the primary data storage device.

A cache is a memory which typically provides faster access to data for input/output operations as compared to storage. Data to be read may be first staged into the cache from storage and then read directly from the cache instead of directly from the storage to provide faster access to read data. Conversely, data to be updated may be first updated in the cache and then destaged to storage which is typically non-volatile storage, that is, the data persists in the non-volatile storage notwithstanding a loss of power to the storage. By comparison, some or all of the cache memory may be volatile memory, that is, data may not persist in a volatile cache in the event of a power failure.

When destaging data from the cache to storage, data can frequently be destaged with less overhead for a given amount of data, if the data is being written to contiguous locations in storage, particularly in disk-based storage which can store data contiguously in tracks. By comparison, if data written into cache contains "holes" in which each hole is a boundary which marks the ending of one contiguous region of write data and the beginning of another and different contiguous region of write data, the write data containing one or more holes will typically require more overhead to complete the destaging of that data with holes as compared to if there were no holes in the write data.

For example, a complete track of data written to cache without any holes may in one known system have 112 sectors of data which will typically include both modified and unmodified data. When destaged to storage, the track will be written to 112 contiguous sector locations in the storage. In one known Redundant Array of Independent Disks (RAID) storage system, a contiguous region of RAID storage may be written to in as few as three input/output (I/O) operations. Since the complete track lacks any holes and therefore will be stored in a single contiguous region of storage, the entire track may be destaged to storage in as few as three I/O operations.

By comparison, a track written to cache may be incomplete such that it defines holes between contiguous regions of data. For example, a track written to cache may have data for only sectors 1 to 4, 10 to 20, 50 to 60, 90 to 100 and 110 to 115 such that only those sectors of the possible 120 sectors exist in cache in modified or unmodified form. Missing data for sectors 5 to 9, 21 to 49, 61 to 89, 101 to 109 and 116 to 120 define five holes separating the four contiguous regions of data in cache. Destaging this track of four contiguous data regions separated by five holes can have significantly greater overhead. For example, destaging a track of four contiguous data regions separated by holes to a known RAID array can cause 4*3=12 I/O operations to the RAID drive if each contiguous region causes 3 I/O drive operations.

One known technique for reducing increased destaging overhead due to holes in tracks written to cache is often referred to as "Picket Fence Staging." Upon completion of a write operation to cache as indicated by, for example, an end track access, cache logic checks the number of holes in a track written to cache and starts to prestage the track from storage if the number of holes in the track written to cache exceeds four holes. The track data prestaged from storage may be used to provide the missing data to "fill the holes" and thereby make the track whole prior to destaging it to storage. For example, the prestaged track can provide the data missing in the cache for the track in the example above, for sectors 5 to 9, 21 to 49, 61 to 89, 101 to 109 and 116 to 120 to eliminate the five holes which previously separated the four contiguous regions of data in cache. A complete track of a single contiguous region of 120 sectors and thus lacking any holes may then be destaged to storage with reduced overhead.

A storage class memory (SCM) system utilizes low latency Dynamic Random Access Memory (DRAM) and one or more higher latency flash NAND memory devices, which may be less expensive than DRAM, to potentially provide greater storage in the memory or cache at a lower cost by using higher latency, lower cost NAND devices. SCM allows system memory to be expanded with non-volatile memory NAND devices.

Flash memory devices typically have less endurance than DRAM as there are typically a limited number of erase cycles for flash bit cells, usually far less so than for DRAM cells. One known technique to reduce wear on the flash memory devices is to use wear leveling techniques that distribute writes across multiple flash memory cells in the same or different device to avoid overuse of specific flash memory cells.

Another problem with flash based devices is often referred to as "garbage collection." Flash based devices typically reclaim memory which has been written to by erasing memory a block at a time so that new data may be written to the erased block. However, an erased block includes many pages of memory whereas writes to flash are typically done in pages. Since reclaiming is done at the level of erase blocks instead of at the page level at which writes occur, flash memory can become fragmented, increasing the need for processor intensive garbage collection operations.

SUMMARY

Picket fence staging in a multi-tier cache in a data storage system in accordance with the present description provides a significant improvement in computer technology. For example, multi-tier picket fence staging logic can significantly improve reduction of destaging overhead caused by holes within incomplete tracks cached in a cache. In one embodiment, for a track stored in storage and having a set of sectors of data, update data for the track is cached in a fast cache tier of a multi-tier cache in a first track write caching operation which includes caching update data for a first subset of sectors of the track in the fast cache tier and omitting caching data for a second subset of sectors of the track in the fast cache tier to define upon completion of the first track write caching operation, a number of track holes equal to zero or more track holes of the track in the fast cache tier in which a track hole corresponds to one or more contiguous sectors of the second subset of sectors of the track for which data caching is omitted during the first track write caching operation. The number of track holes defined by the second subset of sectors omitted from the first track write caching operation is determined, and prestage requests are queued in one of a plurality of prestage request queues as a function of the number of track holes determined to be present in the second subset of sectors absent from the fast cache tier. Each prestage request when executed prestages read data from storage to a slow cache tier of the multi-tier cache, for one or more sectors for the second subset of sectors identified by one or more track holes.

In one embodiment, the slow cache tier of a multi-tier cache may have substantially larger memory capacity as compared to many known DRAM type only caches. As a result, in accordance with one aspect of the present description, more tracks may be prestaged in the slow cache tier of the multi-tier cache for purposes of providing missing data to fill holes and thereby make more tracks of the cache whole prior to destaging those tracks to the storage.

It is recognized herein that the greater the number of holes in an incomplete track, the greater the impact on destaging overhead when destaging an incomplete track. In another aspect of the present description, prestaging requests may be assigned varying levels of priority as a function of the number of holes present in an incomplete track to be destaged. In one embodiment, the plurality of prestage request queues includes a first prestage request queue for queuing prestage requests having a first priority, a second prestage request queue for queuing prestage requests having a second priority lower than the first priority, and a third prestage request queue for queuing prestage requests having a third priority lower than the second priority. For example, a request for prestaging a track from storage for an incomplete track having a relatively high number of holes in cache may be placed on the high priority prestage request queue, a request for prestaging a track from storage for an incomplete track having an intermediate number of holes in cache may be placed on the medium priority prestage request queue and a request for prestaging a track from storage for an incomplete track having a relatively low number of holes in cache may be placed on the low priority prestage request queue.

In one embodiment, prestage requests are queued in the first prestage request queue if the number of track holes determined to be present in second subset of sectors absent from the fast cache tier, is in a first range of number of holes, prestage requests are queued in the second prestage request queue if the number of track holes determined to be present in second subset of sectors absent from the fast cache tier, is in a second range of number of holes, and prestage requests are queued in the third prestage request queue if the number of track holes determined to be present in second subset of sectors absent from the fast cache tier, is in a third range of number of holes. In embodiments in which the slow cache tier has a relatively large memory capacity, prestaging lower priority tracks need not crowd out higher priority tracks. As a result, destaging overhead caused by holes within incomplete tracks may be further reduced by extending prestaging to lower priority incomplete tracks.

In yet another aspect, tasks are allocated for execution of prestage requests queued on the first, second and third prestage request queues as a function of available storage drive access bandwidth for prestaging tracks stored in the storage to the slow cache tier. In addition, allocated tasks are dispatched to execute prestage requests queued on selected prestage request queues of the first, second and third prestage request queues as a function of the first, second and third priority associated with first, second and third prestage request queues, respectively. In one embodiment, the higher priority of the prestage request queue, the more frequently prestage requests queued on the particular queue are executed with a dispatched task.

In this manner, picket fence staging in a multi-tier cache in accordance with the present description, may improve the efficiency of the computer system including reducing destaging overhead. Other aspects and advantages may be realized, depending upon the particular application.

DETAILED DESCRIPTION

Figure 1:
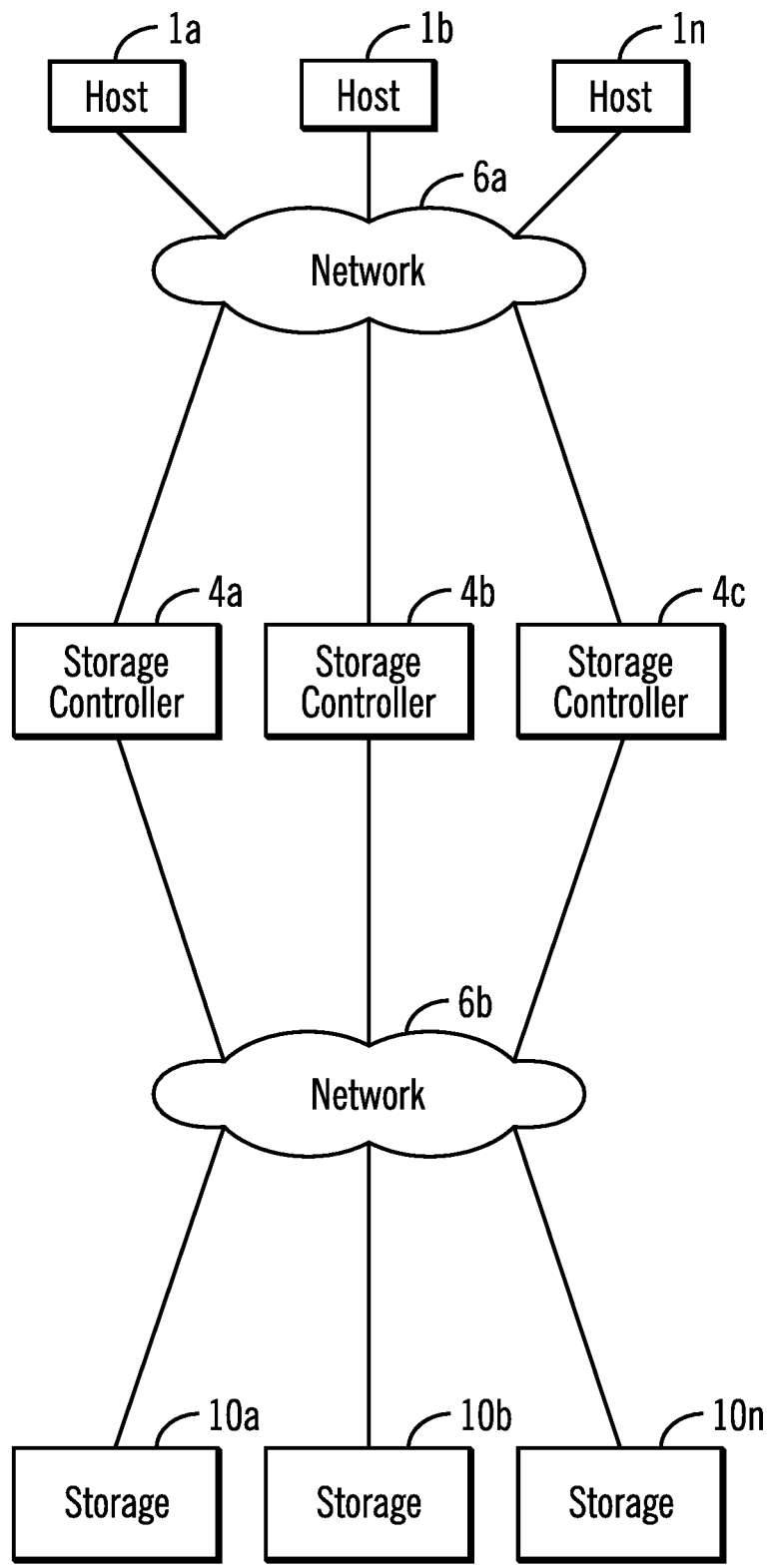
FIG. 1 illustrates an embodiment of a computing environment employing picket fence staging in a multi-tier cache in a data storage system in accordance with one aspect of the present description.

Picket fence staging in a multi-tier cache in a data storage system in accordance with one aspect of the present description provides a significant improvement in computer technology. In one embodiment, multi-tier picket fence staging logic can significantly improve reduction of destaging overhead caused by holes within incomplete tracks, as compared to a known picket fence staging technique. For example, a system employing picket fence staging in one embodiment has a multi-tier cache which includes a relatively fast cache tier which may be implemented with DRAM memory, for example, and a relatively slower access cache tier which may be implemented with storage class memory (SCM), for example. In one embodiment, the slow cache tier of a multi-tier cache may have substantially larger memory capacity as compared to many known DRAM type only caches. As a result, in accordance with one aspect of the present description, more tracks may be prestaged in the slow cache tier of the multi-tier cache for purposes of providing missing data to fill holes and thereby make more tracks of the cache whole prior to destaging those tracks to the storage. Furthermore, it is recognized herein that prestaging tracks into a single tier cache or into the fast cache tier only instead of into the slow cache tier of a multi-tier cache, may take up substantial single tier or fast cache tier space which can result in a lower cache hit ratio for other tracks in the cache.

In general, it is recognized herein that the greater the number of holes in an incomplete track, the greater the impact on destaging overhead when destaging an incomplete track. In another aspect of the present description, prestaging requests may be assigned varying levels of priority as a function of the number of holes present in an incomplete track to be destaged. Moreover, prestaging need not be limited to high priority tracks having more than four holes, for example. Instead, prestaging may be extended to lower priority tracks such as those having four or less holes such as three or two holes, for example, depending upon the particular application. Due to the higher memory capacity of the slow cache tier, prestaging lower priority tracks having 2-4 holes need not crowd out higher priority tracks having more than four holes. As a result, destaging overhead caused by holes within incomplete tracks may be further reduced by extending prestaging to lower priority incomplete tracks.

In yet another aspect of the present description, a memory includes multiple pre-stage request queues of varying priority. As explained in greater detail below, requests to prestage tracks from storage to cache for the purpose of making incomplete tracks in the cache complete or whole prior to destaging to storage, may be placed on a particular prestage request queue selected as a function of the number of holes in the incomplete track to be made whole. In the illustrated embodiment, the multiple prestage request queues include a high priority prestage request queue to queue high priority prestage requests, a medium priority prestage request queue to queue medium priority prestage requests, and a low priority prestage request queue to queue low priority prestage requests. Thus, a request for prestaging a track from storage for an incomplete track having a relatively high number of holes in cache may be placed on the high priority prestage request queue, a request for prestaging a track from storage for an incomplete track having an intermediate number of holes in cache may be placed on the medium priority prestage request queue and a request for prestaging a track from storage for an incomplete track having a relatively low number of holes in cache may be placed on the low priority prestage request queue. It is appreciated that the number of prestage request queues of different levels of priority, may vary, depending upon the particular application.

In still another aspect of multi-tier picket fence staging in accordance with the present description, multi-tier picket fence staging logic allocates tasks for executing queued prestage requests as a function of available storage drive access bandwidth for prestaging data from storage to the cache. In general the greater the availability of storage drive access bandwidth, the greater the number of tasks which are allocated for execution of prestage requests queued on the prestage request queues. It is appreciated that the number of prestage tasks allocated for execution of prestage requests may be a function of other criteria, depending upon the particular application.

In yet another aspect of multi-tier picket fence staging in accordance with the present description, multi-tier picket fence staging logic distributes dispatching of allocated tasks to the prestage request queues for executing queued prestage requests, as a function of the priority level of the prestage request queues. For example, in one embodiment, for each prestage task dispatched for the low priority prestage request queue, up to three prestage tasks may be dispatched for the medium priority prestage request queue, and up to ten tasks may be dispatched for the high priority prestage request queue. In this manner, the higher priority of the prestage request queue, the more frequently prestage requests queued on the particular queue are executed with a dispatched task. It is appreciated that the task dispatching limits imposed on individual prestage request queues as a function of queue priority, and the ratios of prestage tasks dispatches for the respective prestage request queues, may vary, depending upon the particular application.

In this manner, picket fence staging in a multi-tier cache in accordance with the present description, may improve the efficiency of the computer system including reducing destaging overhead. Other aspects and advantages may be realized, depending upon the particular application.

A system of one or more computers may be configured for picket fence staging in a multi-tier cache in accordance with the present description, by virtue of having software, firmware, hardware, or a combination of them installed on the system that in operation causes or cause the system to perform write transfer resource management in accordance with the present description. For example, one or more computer programs may be configured to perform picket fence staging in a multi-tier cache by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

FIGS. 1-6 illustrate an embodiment of a computing environment employing picket fence staging in a multi-tier cache in a data storage system in accordance with the present description. In this example, a plurality of hosts 1a, 1b . . . 1n may submit Input/Output (I/O) requests to one or more storage controllers 4a, 4b . . . 4n over a network 6a to access data stored in storage 10a, 10b . . . 10n by the storage controllers 4a, 4b . . . 4n over a network 6b. Each storage controller and the storage controlled by the storage controller over the network 6b form a data storage system. The hosts 1a, 1b . . . 1n may be separate physical devices or may be virtual devices implemented using assigned resources of partitions of a server, for example. In a similar manner, the storage controllers 4a, 4b . . . 4n may be separate physical devices or may be virtual devices implemented using assigned resources of partitions one or more servers, for example.

Figure 2:
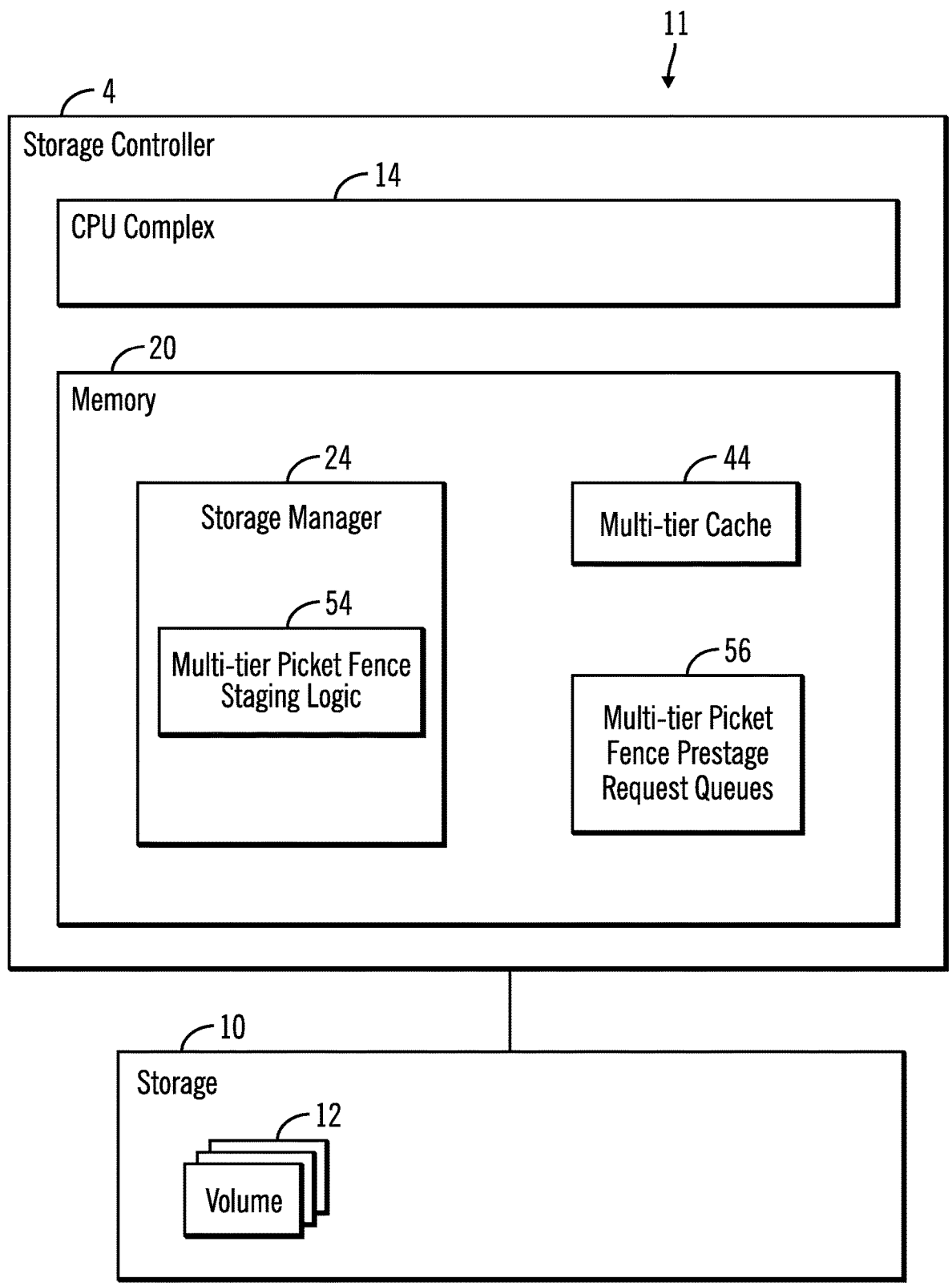
FIG. 2 illustrates an example of a data storage system including a storage controller and storage device of the computing environment of FIG. 1, employing picket fence staging in a multi-tier cache in accordance with one aspect of the present description.
Figure 3:
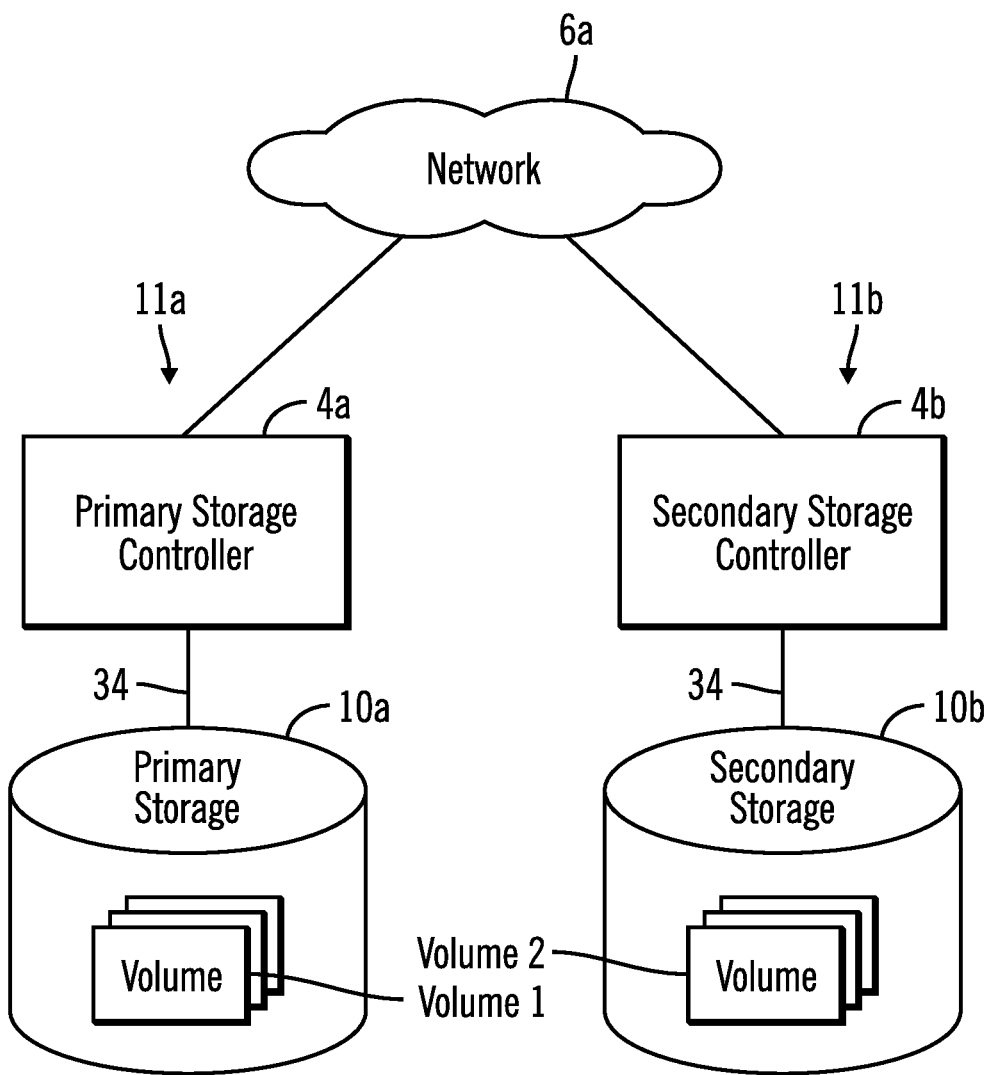
FIG. 3 illustrates an example of a primary and secondary data storage system including storage controllers of the computing environment of FIG. 1, employing picket fence staging in a multi-tier cache in accordance with one aspect of the present description.

FIG. 2 shows in greater detail an example of a data storage system 11 employing picket fence staging in a multi-tier cache in accordance with the present description. The data storage system 11 is similar to and representative of the data storage systems of FIG. 1 which include the storage controllers 4a, 4b . . . 4n and storage 10a, 10b . . . 10n. FIG. 3 illustrates an example of a storage system having a primary data storage system 11a and a secondary data storage system 11b, in which one or both of the primary or secondary storage systems employ picket fence staging in a multi-tier cache in accordance with one aspect of the present description.

Each data storage system 11 (FIG. 2), 11a, 11b (FIG. 3) includes a storage controller or control unit 4 (FIG. 2), 4a (FIG. 3), 4b which accesses data at volumes 12 (FIG. 2), volume1, volume2 (FIG. 3) (e.g., LUNs (Logical Units), Logical Devices, Logical Subsystems, etc.) in storage represented by one or more storage drives 10 (FIG. 2), 10a, (FIG. 3), 10b (FIG. 3). Each storage controller 4, 4a, 4b includes a CPU complex 14 (FIG. 2), including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a (FIG. 3), 4b further has a memory 20 (FIG. 2) that includes a storage manager 24 for managing storage operations including writing data to or reading data from an associated storage 10, 10a (FIG. 3), 10b, respectively, in response to an I/O data request from a host. The storage operations managed by the storage manager 24 further include data replication operations from a primary volume1 (FIG. 3) of a primary data storage system such as the data storage system 11a, for example, to a secondary volume2 at a secondary data storage system such as the data storage system 11b, for example. The storage manager 24 is configured to generate copies of the primary volume1 (FIG. 3) of the primary data storage system 11a as a secondary volume2 (FIG. 3) of the secondary data storage system 11b. The pair of volumes, volume1, volume2 are in a copy relationship such that updates to the primary volume1 are replicated to the secondary volume2.

In the illustrated embodiment, the memory 20 further includes a multi-tier cache 44 which provides faster access to data for input/output operations as compared to storage such as the storage 10. Data to be read may be first staged by the storage manager 24 into the multi-tier cache 44 from storage 10 and then read directly from the multi-tier cache 44 instead of directly from the storage 10 to provide faster access to read data. Conversely, data to be written or otherwise updated may be first written to or updated in the cache and then destaged to storage 10 which is typically non-volatile storage, that is, the data persists in the non-volatile storage notwithstanding a loss of power to the storage.

Figure 4:
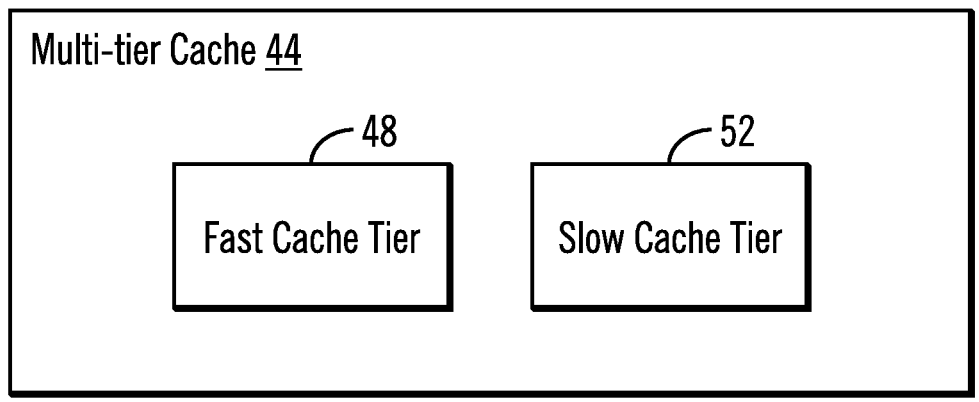
FIG. 4 illustrates an example of a multi-tier cache of the computing environment of FIG. 1, employing picket fence staging in accordance with one aspect of the present description.

As shown in FIG. 4, the multi-tier cache 44 of the illustrated embodiment, has multiple tiers of varying access speed or capacity, or both. In the embodiment of FIG. 4, the multi-tier cache 44 includes a fast access cache tier such as fast cache tier 48 which may be implemented with volatile DRAM memory, for example. A second, somewhat slower access tier indicated as the slow cache tier 52 in FIG. 4 has greater read or write latency as compared to the fast cache tier 48 but may have larger capacity, for example, as compared to the fast cache tier 48. The slow cache tier 52 may be implemented with storage class memory (SCM), for example. It is appreciated that the number of tiers, and the type of memory implementing each tier may vary, depending upon the particular application.

The multiple tiers 48, 52 are used effectively as a single, extended cache 44. In one embodiment, a cache directory is provided for the fast cache tier 48 and a cache directory is provided for the slow cache tier 52. One least recently used (LRU) list is maintained for tracks in the fast cache tier 48 and another least recently used (LRU) list is maintained for tracks in the slow cache tier 52. In the illustrated embodiment, the cache tiers 48, 52 are divided into 4K segments and each segment has a 256 byte descriptor associated with it. A track written or staged to the cache 44 may have from 2 to 17 segments, depending upon how complete or incomplete the track is. It is appreciated that cache scanning techniques other than LRU may be utilized and that the data may be formatted using other data subunits other than tracks and segments, depending upon the particular application.

A local memory interface may be used to communicate with the fast cache tier 48, such as for a DRAM, and a storage device interface may be used to communicate with the slow cache tier 52, such as Non-Volatile Memory Express (NVME) to communicate with flash memory and SSDs. In one embodiment, the fast cache tier 48 may comprise a high cost and very low latency device such as a Dynamic Random Access Memory (DRAM) or Static Random Access Memory (SRAM), and the slow cache tier 52 may comprise less expensive and higher latency and higher capacity storage devices such as non-volatile random access memory (NVRAM), including Magnetoresistive Random Access Memory (MRAM), Phase Change Memory (PCM), Resistive Random Access Memory (RRAM), spin transfer torque memory (STM-RAM), conductive bridging RAM (CBRAM), NAND memory devices, such as flash memory and solid state drives (SSDs), etc. In one embodiment, the slow cache tier 52 may include storage devices having different endurance profiles with different number of available erase cycles, such that higher level of the memory devices allow for a greater number of erase cycles, i.e., greater endurance, than the lower level of the memory devices.

The storage manager 24 includes multi-tier picket fence staging logic 54 (FIG. 2) which can significantly improve reduction of destaging overhead caused by holes within incomplete tracks, as compared to a known picket fence staging technique. For example, the slow cache tier 52 of the multi-tier cache 44 may have substantially larger memory capacity as compared to many known DRAM type only caches. As a result, in accordance with one aspect of the present description, more tracks may be prestaged in the slow cache tier 52 of the multi-tier cache 44 for purposes of providing missing data to fill holes and thereby make more tracks of the fast cache tier 48 whole prior to destaging those tracks to the storage 10.

Furthermore, in another aspect of the present description, prestaging need not be limited to high priority tracks having more than four holes. Instead, prestaging may be extended to lower priority tracks such as those having four or less holes such as three, two or even just one hole, depending upon the particular application. Due to the higher memory capacity of the slow cache tier 52, prestaging lower priority tracks having 1-4 holes need not crowd out higher priority tracks having more than four holes. As a result, destaging overhead caused by holes within incomplete tracks. may be further reduced.

In yet another aspect of the present description, the memory 20 includes multiple pre-stage queues 56 of varying priority depending upon the number of holes within a track in cache to be made whole before being destaged to storage. As explained in greater detail below, requests to prestage tracks from storage for the purpose of making incomplete tracks in the cache complete or whole prior to destaging to storage, may be placed on a selected prestage request queue as a function of the number of holes in the incomplete track to be made whole. In the illustrated embodiment, the multiple prestage request queues 56 include a high priority prestage request queue 60 (FIG. 5) to queue high priority prestage requests, a medium priority prestage request queue 64 (FIG. 5) to queue medium priority prestage requests, and a low priority prestage request queue 68 (FIG. 5) to queue low priority prestage requests. Thus, a request for prestaging a track from storage for an incomplete track having a relatively high number of holes in the fast cache tier 48 (FIG. 4) for example, may be placed on the high priority prestage request queue 60, a request for prestaging a track from storage for an incomplete track having an intermediate number of holes may be placed on the medium priority prestage request queue 64, and a task requesting prestaging a track from storage for an incomplete track having a relatively low number of holes in the fast cache tier 48 (FIG. 4) may be placed on the low priority prestage request queue 68. As explained in greater detail below, the higher priority prestage request queues may be allocated proportionally larger numbers of task dispatches, permitting prestaging for tracks having a higher number of holes to have priority over the prestaging for tracks having a relatively lower number of holes.

In this manner, picket fence staging in a multi-tier cache in accordance with the present description, may improve the efficiency of the computer system. Other aspects and advantages may be realized, depending upon the particular application.

The CPU complex 14 of each storage controller may have multiple clusters of processors, each cluster having its own assigned memory 20, storage manager 24, cache, etc. The processing and memory resources assigned each cluster may be physical, virtual, shared, transferrable or dedicated, depending upon the particular application.

In the illustrated embodiment, the multi-tier picket fence staging logic 54 of the storage controller 4, is depicted as software stored in the memory 20 and executed by the CPU complex 14. However, it is appreciated that the logic functions of the multi-tier picket fence staging logic 54 may be implemented as hardware, software, firmware or any combination of one or more thereof, depending upon the particular application. In addition, logic functions of the multi-tier picket fence staging logic 54 may be implemented in a host or storage.

In one embodiment, the storage or storage drives 10 (FIG. 2), 10a, 10b . . . 10n (FIG. 1) may be comprised of one or more sequential access storage devices, such as hard disk drives and magnetic tape or may include non-sequential access storage devices such as solid state drives (SSD), for example. Each storage drive 10, 10a, 10b . . . 10n may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The storage devices of the storage drives 10, 10a, 10b . . . 10n may be configured to store data in subunits of data storage such as tracks, extents, blocks, pages, segments, cylinders, volumes, etc. Although picket fence staging in a multi-tier cache in accordance with the present description is described in connection with storage subunits such as tracks, it is appreciated that picket fence staging in a multi-tier cache in accordance with the present description is applicable to other storage subunits such as volumes, extents, blocks, pages, segments, cylinders, etc.

The system components 1a, 1b . . . 1n, 4, 4a, 4b, 4n, 10, 10a, 10b . . . 10n are connected to the networks 6a, 6b which enable communication among these components via switches, links, and endpoint devices such as adapters. Thus, the networks 6a, 6b include in one embodiment, a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage systems to the hosts 1a, 1b, . . . 1n and from the storage controllers 4, 4a, 4b, 4n to the storage 10, 10a, 10b . . . 10n may be based upon various attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 6:
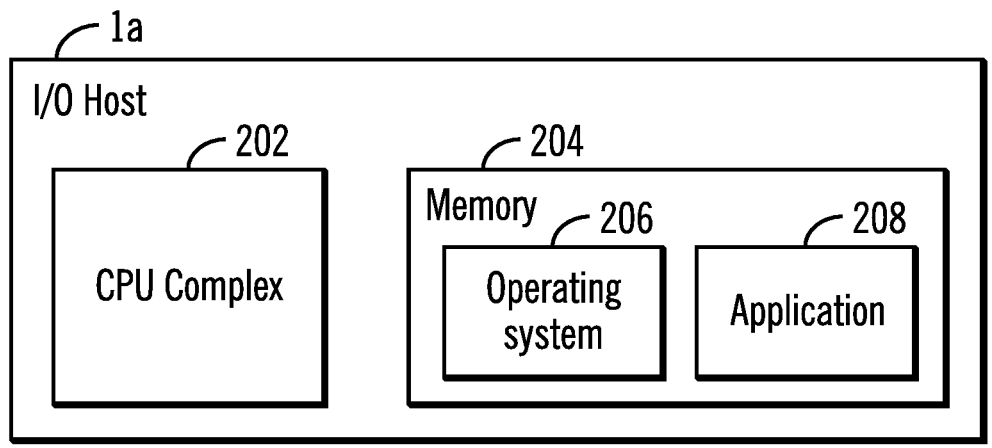
FIG. 6 illustrates an example of a host of the computing environment of FIG. 1, employing picket fence staging in a multi-tier cache in a data storage system in accordance with one aspect of the present description.

A typical host as represented by the host 1a of FIG. 6 includes a CPU complex 202 and a memory 204 having an operating system 206 and an application 208 that cooperate to read data from and write data updates to the primary storage 10a (FIG. 3) or secondary storage 10b via a storage controller 4, 4a, 4b . . . 4n. An example of a suitable operating system is the z/OS operating system. It is appreciated that other types of operating systems may be employed, depending upon the particular application.

Picket fence staging in a multi-tier cache in accordance with the present description, may be applied to any computer system having a memory utilizing logic as represented by the multi-tier picket fence staging logic 54 (FIG. 2). Thus, each host such as the host 1a, for example, may also employ logic for picket fence staging in a multi-tier cache.

The hosts 1a, 1b . . . 1n, the storage controllers 4, 4a, 4b, storage devices 10, 10a, 10b, and the multi-tier picket fence staging logic 54 may each be implemented using any computational device which has been modified for picket fence staging in a multi-tier cache in accordance with the present description. Computational devices suitable for modification as described herein include those presently known in the art, such as, a personal computer, a workstation, a server, a mainframe, a hand held computer, a palm top computer, a telephony device, a network appliance, a blade computer, a processing device, etc. The hosts 1a, 1b . . . 1n, the storage controllers 4, 4a, 4b . . . 4n, storage devices 10, 10a, 10b . . . 10n, and the multi-tier picket fence staging logic 54 may be elements in any suitable network, such as, a storage area network, a wide area network, the Internet, an intranet, or elements in a cloud computing environment.

Figure 5:
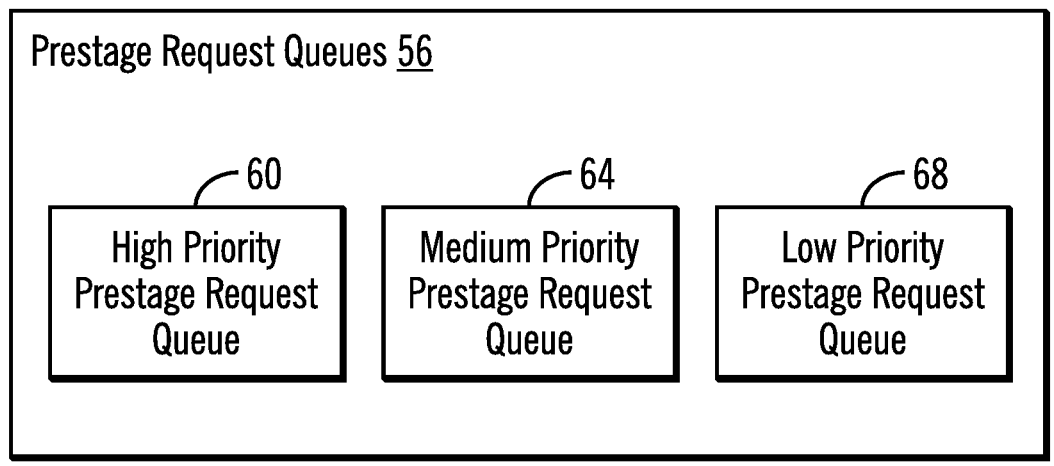
FIG. 5 illustrates an example of multiple prestage request queues of the computing environment of FIG. 1, employing picket fence staging in accordance with one aspect of the present description.

FIGS. 7-10 depict one embodiment of operations of the multi-tier picket fence staging logic 54 (FIG. 2) of the storage controller 4 in connection with the multi-tier cache 44 (FIG. 4) and the multiple pre-staging queues 56 (FIG. 5). In this example, logic elements of the multi-tier picket fence staging logic 54 (FIG. 2) and the multi-tier cache 44 (FIG. 4) and the multiple pre-staging queues 56 (FIG. 5) are configured to perform an embodiment of picket fence staging in a multi-tier cache as depicted in FIGS. 7-10 the accompanying description herein.

Figure 7:
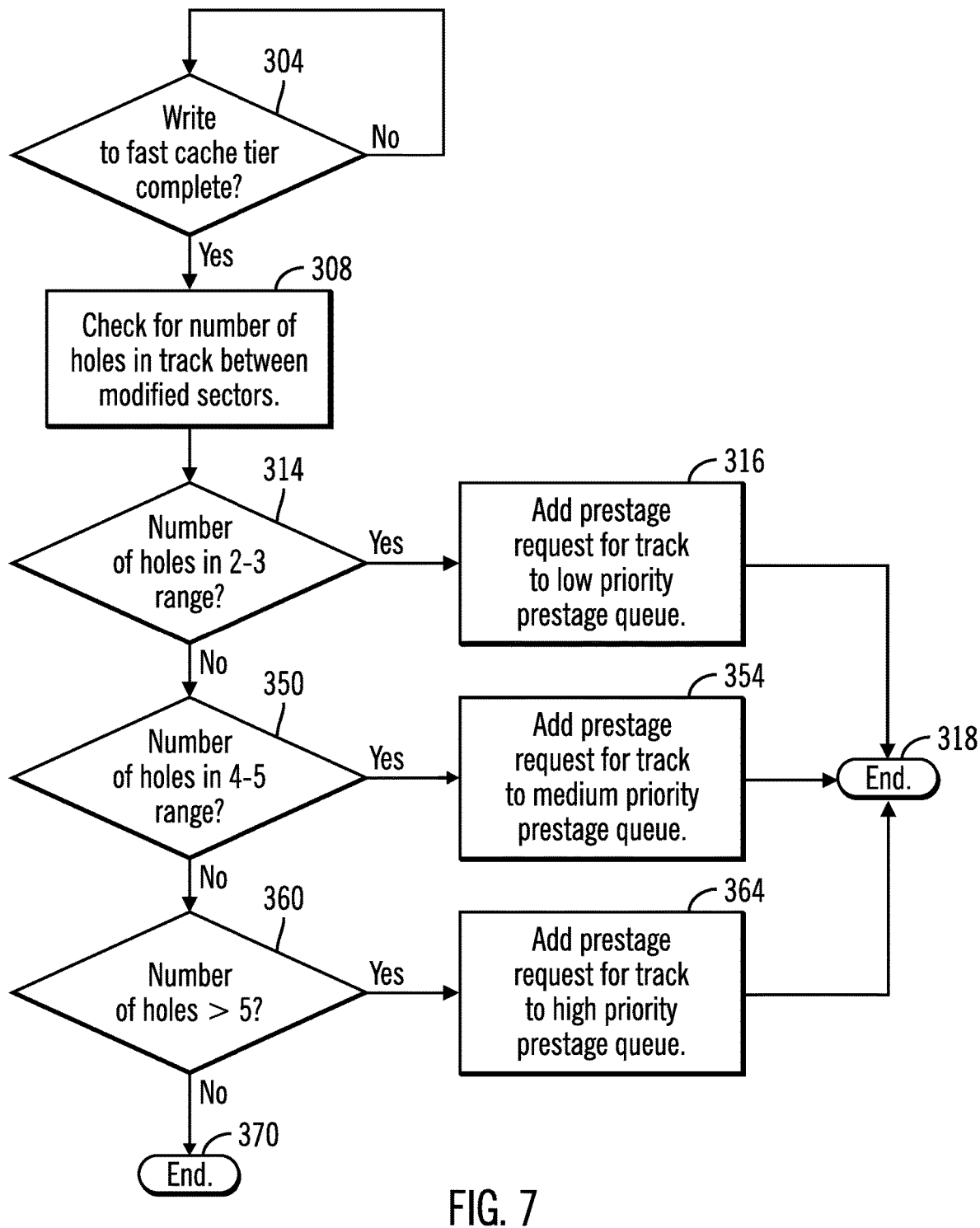
FIG. 7 illustrates an example of operations of components of the computing environment of FIG. 1, including operations of queuing prestage requests on multiple priority prestage request queues in accordance with one aspect of the present description.

In the example of FIG. 7, upon completion (block 304, FIG. 7) of a write operation to the cache 44, a track, either a complete track having 120 sectors of data, or an incomplete track having less than 120 sectors of data will have been written to the fast cache tier 48. Such a write operation may be performed by a host such as the host 1a, for example. Other processing entities may also write to the cache 44.

At some point subsequent to the completion of the write operation, a destage operation will be initiated to destage the data of the track from the cache 44 to the storage 10. In accordance with multi-tier picket fence staging of the present description, a determination is made (block 308, FIG. 7) as to whether the track of data to be destaged contains holes, that is, missing sectors for which data has not been written. If holes are present in the track written to the cache 44, further determinations are made as to how many holes are present in the track written to the cache 44, as described below.

Figure 11A:
FIGS. 11A-11D depict various examples of complete and incomplete tracks for use with picket fence staging in a multi-tier cache in a data storage system in accordance with one aspect of the present description.

FIG. 11a shows an example of a complete track 310a having the maximum number of sectors, that is, 120 sectors of data, which may include modified data, unmodified data, or both. Thus, the track 310a is one contiguous region of data and lacks any missing sectors of data, that is, holes. It is appreciated that in other embodiments, a complete track lacking any holes may have a greater number or a lesser number of sectors, depending upon the particular application. A complete track having 120 sectors of data is provided for purposes of example only.

Figure 11B:
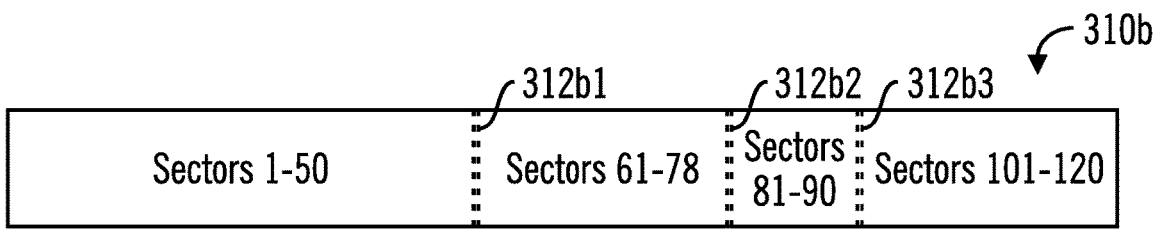

By comparison to the complete track 310a (FIG. 11A) lacking any holes, FIG. 11B depicts an example of a track 310b having three holes, a first hole 312b1 between a region of contiguous sectors 1-50 of data and a region of contiguous sectors 61-78 of data, a second hole 312b2 between the region of contiguous sectors 61-78 of data and a region of contiguous sectors 81-90 of data, and a third hole 312b3 between the region of contiguous sectors 81-90 of data and a region of contiguous sectors 101-120 of data. In this example, the fast cache tier 48 contains update data for the sectors 1-50, 61-68, 81-90 and 101-120 of the track 310b whereas the holes 312b1, 312b2, and 312b3 represent missing sectors 51-60, 79-80 and 91-100, respectively, for which the fast cache tier 48 lacks any update data associated with the completed write operation. Thus, the sectors 1-50, 61-68, 81-90 and 101-120 containing update data in the fast cache tier for the track 310b define a first or present subset of sectors of the track. Further, the missing sectors 51-60, 79-80 and 91-100 define a second or missing subset of sectors for the track 310b. As explained in greater detail below, an incomplete track may be reconstructed to a complete track for destaging by combining the update data of the present sectors cached in the fast cache tier 48 for the track 310b, with data prestaged from storage 10 to the slow cache tier 52 for the missing subset of sectors to form a whole track for destaging.

In accordance with multi-tier picket fence staging of the present description, a determination is made (block 314, FIG. 7) as to whether the track of data to be destaged contains holes within a range of 2-3 holes. If so, a request to prestage data of the corresponding track from storage 10 (FIG. 2) to the slow cache tier 52, is added (block 316, FIG. 7) to the low priority prestage request queue 68, to prestage the data of the missing sectors represented by the holes in the track in the fast tier cache.

It is appreciated herein that a range of 2-3 holes is a relatively low number of holes which has a relatively low impact on destage overhead when destaging the data of the track 310b. Nevertheless, in this embodiment, a request to prestage the missing data of the corresponding stored track from storage 10 (FIG. 2) to the slow cache tier 52, is added (block 316, FIG. 7) to the low priority prestage request queue 68 for a track having 2-3 holes in the fast cache tier 48. As a result, even tracks having a relatively low number of holes may have data of missing sectors prestaged to reduce prestage overhead, albeit at a lower priority in this example. It is appreciated that a range of holes associated with a low priority prestage request queue may vary, either higher or lower, depending upon the particular range.

In the example of FIG. 11B, the track 310b cached in the fast cache tier 48 is determined (block 314, FIG. 7) to have three holes which is within the range of 2-3 holes, and thus a request is added block 316, FIG. 7) to the low priority prestage request queue 68 to prestage to the slow cache tier 52, the data of the missing sectors 51-60, 79-80 and 91-100 from the corresponding track stored in storage 10. Having completed prestage request queuing for the track 310b, prestage request queueing for that track to be subsequently destaged ends (block 318, FIG. 7).

As explained in greater detail below, once the request to prestage data for the track 310b reaches the front of the low priority prestage request queue 68, the request is executed with an available allocated task and the data of the missing sectors 51-60, 79-80 and 91-100, of the holes 312b1, 312b2, and 312b3, respectively, is prestaged into the slow cache tier 52. Upon completion of the requested prestaging of data, the completed request is removed from the prestage request queue and the task dispatched to execute that request is made available for another prestage request which has reached the front of a prestage request queue as described below in connection with FIG. 10.

In the illustrated embodiment, a complete track of 120 sectors may be prestaged from storage 10 to reduce prestaging overhead, and the old data for the sectors 1-50, 61-68, 81-90 and 101-120 from the storage 10 may be discarded since the fast cache tier 48 contains the updated data for the sectors 1-50, 61-68, 81-90 and 101-120. Alternatively, just the data of the missing sectors 51-60, 79-80 and 91-100, of the holes 312b1, 312b2, and 312b3, respectively, may be prestaged into cache in another embodiment.

Once the data for missing sectors has been prestaged into the slow cache tier 52 for a track having holes, the track may be reconstructed to fill the holes with the data of the missing sectors prestaged to slow cache tier 52, and the track may be destaged as a complete track of 120 contiguous sectors to reduce destaging overhead.

Figure 8:
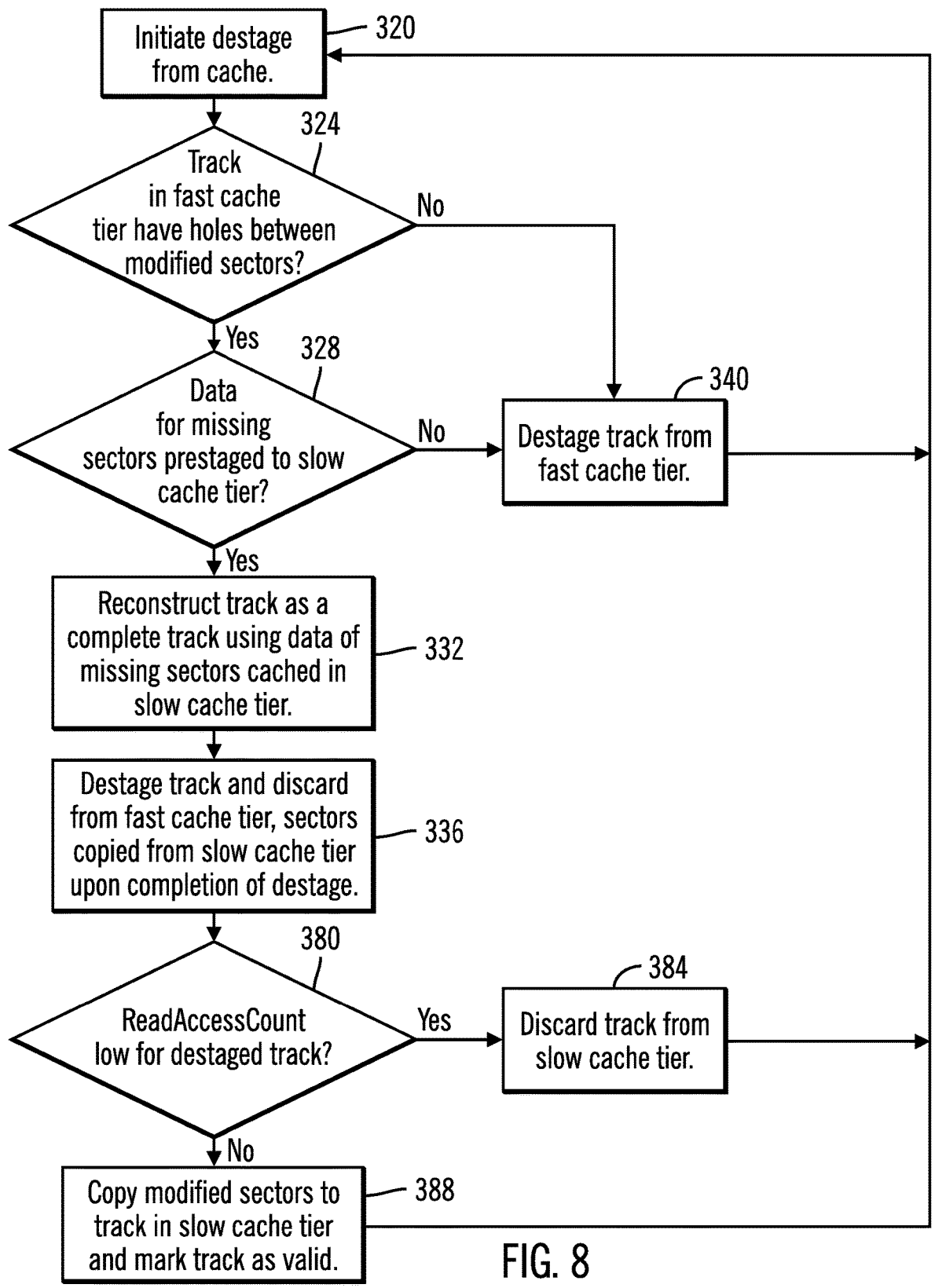
FIG. 8 illustrates an example of operations of components of the computing environment of FIG. 1, including operations of reconstructing incomplete tracks in cache to complete tracks prior to destaging, using data prestaged from storage to cache in accordance with one aspect of the present description.

FIG. 8 shows an example of reconstruction and destage operations using an embodiment of multi-tier picket fence staging of the present description. Destaging operations for a track in the cache 44 may be initiated (block 320, FIG. 8) at any suitable time in accordance with destage procedures. For example, destaging of tracks from cache may occur on a periodic basis or should it be determined that additional space is required in one or both of the fast cache tier 48 and the slow cache tier 52. Upon initiation (block 320, FIG. 8) of destaging of a track having update data in the fast cache tier 48, a determination (block 324, FIG. 8) is made as to whether the track to be destaged is complete or has holes indicated by missing sectors.

If the track to be destaged is determined to have holes, a determination (block 328, FIG. 8) is made as to whether the data for the missing sectors indicated by the holes in the track has been prestaged to cache 44, more specifically, the slow cache tier 52 in this embodiment. If so, the track having holes may be reconstructed (block 332, FIG. 8) to a complete track using the data of the missing sectors which has been prestaged to the slow cache tier 52. In this example, the data of the missing sectors 51-60, 79-80 and 91-100, of the holes 312b1, 312b2, and 312b3, respectively, which was prestaged into the slow cache tier 52, may be combined (block 332, FIG. 8) with the update data for the updated sectors 1-50, 61-68, 81-90 and 101-120 of the track 310b (FIG. 11B) to reconstruct a complete track of 120 sectors similar to the track 310a of FIG. 11A, prior to destaging the complete track (block 336, FIG. 8). By eliminating even the relatively low number of holes of the track 310b prior to destaging, destaging efficiency may be improved.

In one embodiment, a track may be reconstructed (block 332, FIG. 8) by copying the prestaged data of the missing sectors from the slow cache tier 52 to the fast cache tier 48 and combining the copied data of the missing sectors with the update data of the sectors already present in the fast cache tier 48. Upon completion of the destaging of the reconstructed and now complete track, the data copied from the slow cache tier to reconstruct the track may be discarded (block 336, FIG. 8) from the fast cache tier. In this example, the data of the missing sectors 51-60, 79-80 and 91-100, of the holes 312b1, 312b2, and 312b3, respectively, copied to the fast cache tier 48 may be discarded from the fast cache tier 48 upon completion of destaging of the reconstructed track. It is appreciated that track reconstruction may alternatively be performed in the slow cache tier 52 or outside the fast or slow cache tiers 48, 52, depending upon the particular application.

Returning to FIG. 7, if it is determined (block 314, FIG. 7) that the track of data to be destaged does not contain holes within a range of 2-3 holes, in accordance with multi-tier picket fence staging of the present description, another determination is made (block 350, FIG. 7) as to whether the track of data to be destaged contains holes within a range of 4-5 holes. If so, a request to prestage data of the corresponding track from storage 10 (FIG. 2) to the slow cache tier 52, is added (block 354, FIG. 7) to the medium priority prestage request queue 64, to prestage the data of the missing sectors represented by the holes in the track cached in the fast tier cache.

It is appreciated herein that a range of 4-5 holes is a relatively intermediate number of holes which has an intermediate impact on destage overhead when destaging the data of the track. Accordingly, in this embodiment, a request to prestage the missing data of the corresponding stored track from storage 10 (FIG. 2) to the slow cache tier 52, is added (block 354, FIG. 7) to the medium priority prestage request queue 64 for a track having 4-5 holes in the fast cache tier 48. As a result, tracks having an intermediate number of holes may also have data of missing sectors prestaged to reduce prestage overhead, but at a higher priority in this example, as compared to tracks having 2-3 holes, for example. It is appreciated that a range of holes associated with an intermediate priority prestage request queue may vary, either higher or lower, depending upon the particular application.

Figure 11C:
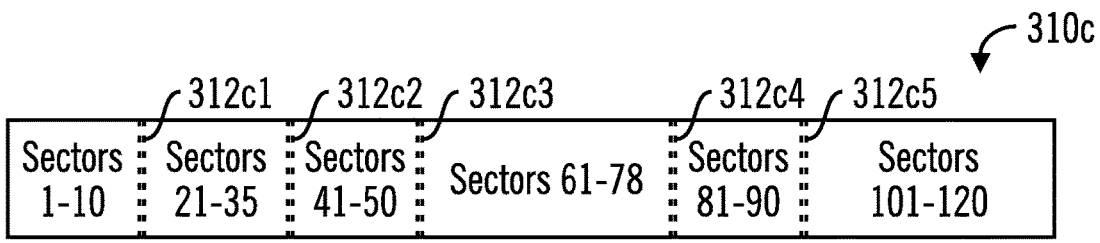

FIG. 11C depicts an example of a track 310c having five holes, a first hole 312c1 between a region of contiguous sectors 1-10 of data and a region of contiguous sectors 21-35 of data, a second hole 312c2 between the region of contiguous sectors 21-35 of data and a region of contiguous sectors 41-50 of data, a third hole 312c3 between the region of contiguous sectors 41-50 of data and a region of contiguous sectors 61-78 of data, a fourth hole 312c4 between the region of contiguous sectors 61-78 of data and a region of contiguous sectors 81-90 of data, and a fifth hole 312c5 between the region of contiguous sectors 81-90 of data and a region of contiguous sectors 101-120 of data. In this example, the fast cache tier 48 contains update data for the sectors 1-10, 21-35, 41-50, 61-68, 81-90 and 101-120 of the track 310c whereas the holes 312c1, 312c2, 312c3, 312c4 and 312c5 represent missing sectors 11-20, 36-40, 51-60, 79-80 and 91-100, respectively, for which the fast cache tier 48 lacks any update data associated with the completed write operation. Thus, the sectors 1-10, 21-35, 41-50, 61-68, 81-90 and 101-120 containing update data in the fast tier cache for the track 310c define a first or present subset of sectors of the track. Further, the missing sectors 11-20, 36-40, 51-60, 79-80 and 91-100 define a second or missing subset of sectors for the track 310c. As explained in greater detail below, a complete track may be reconstructed for destaging by combining the update data of the present sectors cached in the fast cache tier 48 for the track 310c, with data prestaged from storage 10 to the slow cache tier 52 for the missing subset of sectors to form a whole track for destaging.

In the example of FIG. 11C, the track 310c cached in the fast cache tier 48 is determined (block 350, FIG. 7) to have five holes which is within the range of 4-5 holes, and thus a request is added (block 354, FIG. 7) to the medium priority prestage request queue 64 to prestage to the slow cache tier 52, the data of the missing sectors 11-20, 36-40, 51-60, 79-80 and 91-100, from the corresponding track stored in storage 10. As explained in greater detail below, once the request to prestage data for the track 310c reaches the front of the medium priority prestage request queue 64, the request is executed with an available allocated task and the data of the missing sectors 11-20, 36-40, 51-60, 79-80 and 91-100, of the holes 312c1, 312c2, 312c3, 312c4 and 312c5, respectively, is prestaged into the slow cache tier 52. In the illustrated embodiment, a complete track of 120 contiguous sectors may be prestaged from storage 10 to reduce prestaging overhead, and the old data for the sectors 1-10, 21-35, 41-50, 61-68, 81-90 and 101-120 prestaged from the storage 10 may be discarded since the fast cache tier 48 contains the updated data for the sectors 1-10, 21-35, 41-50, 61-68, 81-90 and 101-120.

In a manner similar to that described above for the track 310b, once the data for missing sectors has been prestaged into the slow cache tier 52 for the track 310c having holes, the track may be reconstructed to fill the holes with the data of the missing sectors prestaged to slow cache tier 52, and the track may be destaged as a complete track with no holes to reduce destaging overhead. Referring again to FIG. 8, upon initiation (block 320, FIG. 8) of destaging of the track 310c having update data in the fast cache tier 48, it is determined (block 324, FIG. 8) that the track 310c is not complete but instead has holes indicated by missing sectors.

Accordingly, a determination (block 328, FIG. 8) is made as to whether the data for the missing sectors indicated by the holes in the track 310c has been prestaged to the slow cache tier. If so, the track 310c having holes may be reconstructed (block 332, FIG. 8) to a complete track using the data of the missing sectors which has been prestaged to the slow cache tier 52. In this example, the data of the missing sectors 11-20, 36-40, 51-60, 79-80 and 91-100, of the holes 312c1, 312c2, 312c3, 312c4 and 312c5, respectively, which was prestaged into the slow cache tier 52, may be combined (block 332, FIG. 8) with the cached update data for the updated sectors 1-10, 21-35, 41-50, 61-68, 81-90 and 101-120 of the track 310c (FIG. 11C) to reconstruct a complete track of 120 sectors similar to the track 310a of FIG. 11A, prior to destaging the complete track (block 336, FIG. 8). By eliminating the intermediate number of holes of the track 310c prior to destaging, destaging efficiency may be improved.

Upon completion of the destaging of the reconstructed and complete track, the data copied from the slow cache tier to reconstruct the track may be discarded (block 336, FIG. 8). In this example, the data of the missing sectors 11-20, 36-40, 51-60, 79-80 and 91-100, of the holes 312c1, 312c2, 312c3, 312c4 and 312c5, respectively, copied to the fast cache tier 48 may be discarded from the fast cache tier 48 upon completion of destaging of the reconstructed track. As noted above, it appreciated that track reconstruction may be performed in the slow cache tier 52 or outside the fast or slow cache tiers 48, 52, depending upon the particular application.

Returning again to FIG. 7, if it is determined (block 314, FIG. 7) that the track of data to be destaged does not contain holes within a range of 2-3 holes, and if it is determined (block 350, FIG. 7) that the track of data to be destaged does not contain holes within a range of 4-5 holes, in accordance with multi-tier picket fence staging of the present description, another determination is made (block 360, FIG. 7) as to whether the track of data to be destaged contains holes within a range of greater than five holes. If so, a request to prestage data of the corresponding track from storage 10 (FIG. 2) to the slow cache tier 52, is added (block 364, FIG. 7) to the high priority prestage request queue 60, to prestage the data of the missing sectors represented by the holes in the track in the fast tier cache. Following the enqueuing of the prestage request, prestage request queuing for the track to be destaged ends (block 318, FIG. 7).

It is appreciated herein that a range of greater than 5 holes is a relatively high number of holes which has a relatively high impact on destage overhead when destaging the data of the track. Accordingly, in this embodiment, a request to prestage the missing data of the corresponding stored track from storage 10 (FIG. 2) to the slow cache tier 52, is added (block 364, FIG. 7) to the high priority prestage request queue 60 for a track having more than five holes in the fast cache tier 48. As a result, tracks having a high number of holes may also have data of missing sectors prestaged to reduce prestage overhead, and at a higher priority in this example, as compared to tracks having 4-5 holes, for example. It is appreciated that a range of holes associated with a high priority prestage request queue may vary, either higher or lower, depending upon the particular range.

Figure 11D:
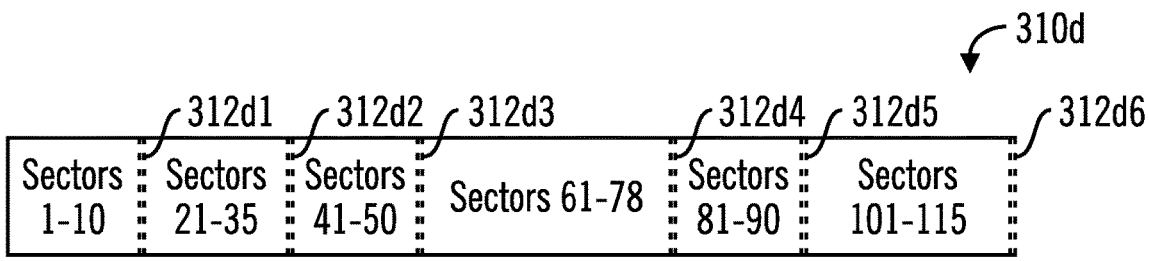

FIG. 11D depicts an example of a track 310d having six holes, a first hole 312d1 between a region of contiguous sectors 1-10 of data and a region of contiguous sectors 21-35 of data, a second hole 312d2 between the region of contiguous sectors 21-35 of data and a region of contiguous sectors 41-50 of data, a third hole 312d3 between the region of contiguous sectors 41-50 of data and a region of contiguous sectors 61-78 of data, a fourth hole 312d4 between the region of contiguous sectors 61-78 of data and a region of contiguous sectors 81-90 of data, a fifth hole 312*d*5 between the region of contiguous sectors 81-90 of data and a region of contiguous sectors 101-115 of data, and a six hole following the region of contiguous sectors 101-115 of data. In this example, the fast cache tier 48 contains update data for the sectors 1-10, 21-35, 41-50, 61-68, 81-90, and 101-115 of the track 310*d* whereas the holes 312*d*1, 312*d*2, 312*d*3, 312*d*4, 312*d*5 and 312*d*6 represent missing sectors 11-20, 36-40, 51-60, 79-80, 91-100, and 116-120 respectively, for which the fast cache tier 48 lacks any update data associated with the completed write operation. Thus, the sectors 1-10, 21-35, 41-50, 61-68, 81-90, and 101-115 containing update data in the fast tier cache for the track 310*d* define a first or present subset of sectors of the track. Further, the missing sectors 11-20, 36-40, 51-60, 79-80, 91-100, and 116-120 define a second or missing subset of sectors for the track 310*d*. As explained in greater detail below, a complete track may be reconstructed for destaging by combining the update data of the present sectors cached in the fast cache tier 48 for the track 310*c*, with data prestaged from storage 10 to the slow cache tier 52 for the missing subset of sectors to form a whole track for destaging.

In the example of FIG. 11D, the track 310*d* cached in the fast cache tier 48 is determined (block 360, FIG. 7) to have six holes which is within the range of greater than five holes, and thus a request is added (block 364, FIG. 7) to the high priority prestage request queue 60 to prestage to the slow cache tier 52, the data of the missing sectors 11-20, 36-40, 51-60, 79-80, 91-100, and 116-120 from the corresponding track stored in storage 10. As explained in greater detail below, once the request to prestage data for the track 310*d* reaches the front of the high priority prestage request queue 60, the request is executed with an available allocated task and the data of the missing sectors 11-20, 36-40, 51-60, 79-80, 91-100, and 116-120 of the holes 312*d*1, 312*d*2, 312*d*3, 312*d*4, 312*d*5 and 312*d*6, respectively, is prestaged from storage 10 into the slow cache tier 52. In the illustrated embodiment, a complete track of 120 sectors may be prestaged from storage 10 to reduce prestaging overhead, and the old data for the sectors 1-10, 21-35, 41-50, 61-68, 81-90, and 101-115 from the storage 10 may be discarded since the fast cache tier 48 contains the updated data for the sectors 1-10, 21-35, 41-50, 61-68, 81-90, and 101-115.

In a manner similar to that describe above for the track 310*c*, once the data for missing sectors has been prestaged into the slow cache tier 52 for the track 310*d* having holes, the track may be reconstructed to fill the holes with the data of the missing sectors prestaged to slow cache tier 52, and the track may be destaged as a complete track to reduce destaging overhead. Referring again to FIG. 8, upon initiation (block 320, FIG. 8) of destaging of the track 310*d* having update data in the fast cache tier 48, it is determined (block 324, FIG. 8) that the track 310*d* is not complete but instead has holes indicated by missing sectors.

Accordingly, a determination (block 328, FIG. 8) is made as to whether the data for the missing sectors indicated by the holes in the track 310*d* has been prestaged to the slow cache tier. If so, the track 310*d* having holes may be reconstructed (block 332, FIG. 8) to a complete track using the data of the missing sectors which has been prestaged to the slow cache tier 52. In this example, the data of the missing sectors 11-20, 36-40, 51-60, 79-80, 91-100, and 116-120 of the holes 312*d*1, 312*d*2, 312*d*3, 312*d*4, 312*d*5 and 312*d*6, respectively, which was prestaged into the slow cache tier 52, may be combined (block 332, FIG. 8) with the update data for the updated sectors 11-10, 21-35, 41-50, 61-68, 81-90, and 101-115 of the track 310*d* (FIG. 11D) to reconstruct a complete track of 120 sectors similar to the track 310*a* of FIG. 11A, prior to destaging the complete track (block 336, FIG. 8). By eliminating the relatively high number of holes of the track 310*d* prior to destaging, destaging efficiency may be improved.

Upon completion of the destaging of the reconstructed and complete track, the data copied from the slow cache tier to reconstruct the track may be discarded (block 336, FIG. 8). In this example, the data of the missing sectors 11-20, 36-40, 51-60, 79-80, 91-100, and 116-120 of the holes 312*d*1, 312*d*2, 312*d*3, 312*d*4, 312*d*5 and 312*d*6, respectively, copied to the fast cache tier 48 may be discarded from the fast cache tier 48 upon completion of destaging of the reconstructed track. As noted above, it appreciated that track reconstruction may be performed in the slow cache tier 52 or outside the fast or slow cache tiers 48, 52, depending upon the particular application.

Returning again to FIG. 7, if it is determined (block 314, FIG. 7) that the track of data to be destaged does not contain holes within a range of 2-3 holes, or within a range of 4-5 holes (block 350, FIG. 7), or within a range of greater than 5 holes (block 360, FIG. 7), it is determined that the track to be destaged has at most one hole and may have zero holes, that is, is a complete track. Accordingly, in the illustrated embodiment, if the track to be destaged has one or fewer holes, a prestage of data is not requested prior to the destaging of the track. Accordingly, a request to prestage data of any missing sectors is not placed on a prestage request queue 60, 64 or 68 as indicated by the end (block 370, FIG. 7) of the prestage queuing process for a track to be destaged.

Instead, upon initiation (block 320, FIG. 8) of destaging of that track having update data in the fast cache tier 48, and a determination (block 324, FIG. 8) that the track to be destaged has at most one hole as indicated by missing sectors, a further determination (block 328, FIG. 8) is made as to whether the data for any missing sectors indicated by the hole in the track has been prestaged to the slow cache tier 52. As noted above, if the track to be destaged has one or fewer holes, a prestage of data for the missing sectors of the hole was not requested and as a result, prestage data for the missing sectors is not present (block 328, FIG. 8) in the slow cache tier prior to destaging of the track having a single hole. Accordingly, the track having a single hole is destaged (block 340, FIG. 8) from the fast cache tier 48 as a track with a single hole rather than reconstructing the track as a complete track prior to destaging as described above in connection with tracks having two or more holes.

In accordance with the present description, it is appreciated that the overhead in prestaging data for a single hole in a track to be destaged, may not be offset by a reduction in destaging overhead achieved by destaging a reconstructed track which has been made whole by filling in missing sectors with prestaged data. Accordingly, in one embodiment of multi-tier picket fence prestaging of the present disclosure, a policy is implemented to bypass prestaging of data for missing sectors if the track to be destaged has only a single hole. It is appreciated that in other embodiments, policies may be selected to bypass prestaging of data of missing sectors for tracks having a greater number of holes than one hole.

In the case of a track to be destaged which is determined (block 324, FIG. 8) to be whole, that is, to have no missing sectors and thus no holes indicated by missing sectors, prestaging is again bypassed. Accordingly, the whole track is destaged (block 340, FIG. 8) directly without prestaging in the same manner as a track having a single hole as described above. It is appreciated that a range of holes associated with bypassing prestaging may vary depending upon the particular application.

In the illustrated embodiment, for each track cached in the cache 44 such as the fast cache tier 52 of the cache 44, a count, referred to herein as "ReadAccessCount" is maintained. The ReadAccessCount for a particular track in cache is incremented each time the track is accessed in cache for a read operation from a host such as the host 1*a*. In another aspect of multi-tier picket fence staging in accordance with the present description, a determination is made (block 380, FIG. 8) as to whether the ReadAccessCount for a track which has been destaged from the cache 44 is low, indicating that the track was accessed in cache a relatively few number of times before it was destaged to storage 10. If the ReadAccessCount for the destaged track is determined (block 380, FIG. 8) to be low, the data which was prestaged to the slow cache tier 52 to make the track whole before destaging, is discarded (block 384, FIG. 8) since it is deemed unlikely that the prestaged data will be needed soon for future destaging or read access operations. The update data cached in the fast cache tier 48 may be discarded as well following destaging of the track, or retained, depending upon the particular application.

The threshold value for what constitutes a "low" ReadAccessCount" will vary, depending upon the particular application. In one embodiment, the threshold value to define a low ReadAccessCount may be selected as a fraction of a computed average ReadAccessCount for tracks cached in the cache 44. Other techniques may be utilized, depending upon the particular application.

Conversely, if the ReadAccessCount for the destaged track is determined (block 380, FIG. 8) to not be low, such as greater than a selected threshold value, for example, it is deemed likely that the prestaged data cached in the slow cache tier 52 and the update data cached in the fast cache tier 48 may likely be needed again for future destaging or read access operations. Accordingly, the updated or modified data which was retained in the fast cache tier 52 following destaging may be copied (block 388, FIG. 8) to the slow cache tier 52 and combined with prestaged data for the missing sectors cached in the slow cache tier 52 to reconstruct the whole track which was destaged, in the slow cache tier 52. In addition, the reconstructed whole track may be marked as valid. The update data cached in the fast cache tier 48 may be discarded or retained following destaging of the track, depending upon the particular application.

Figure 9:
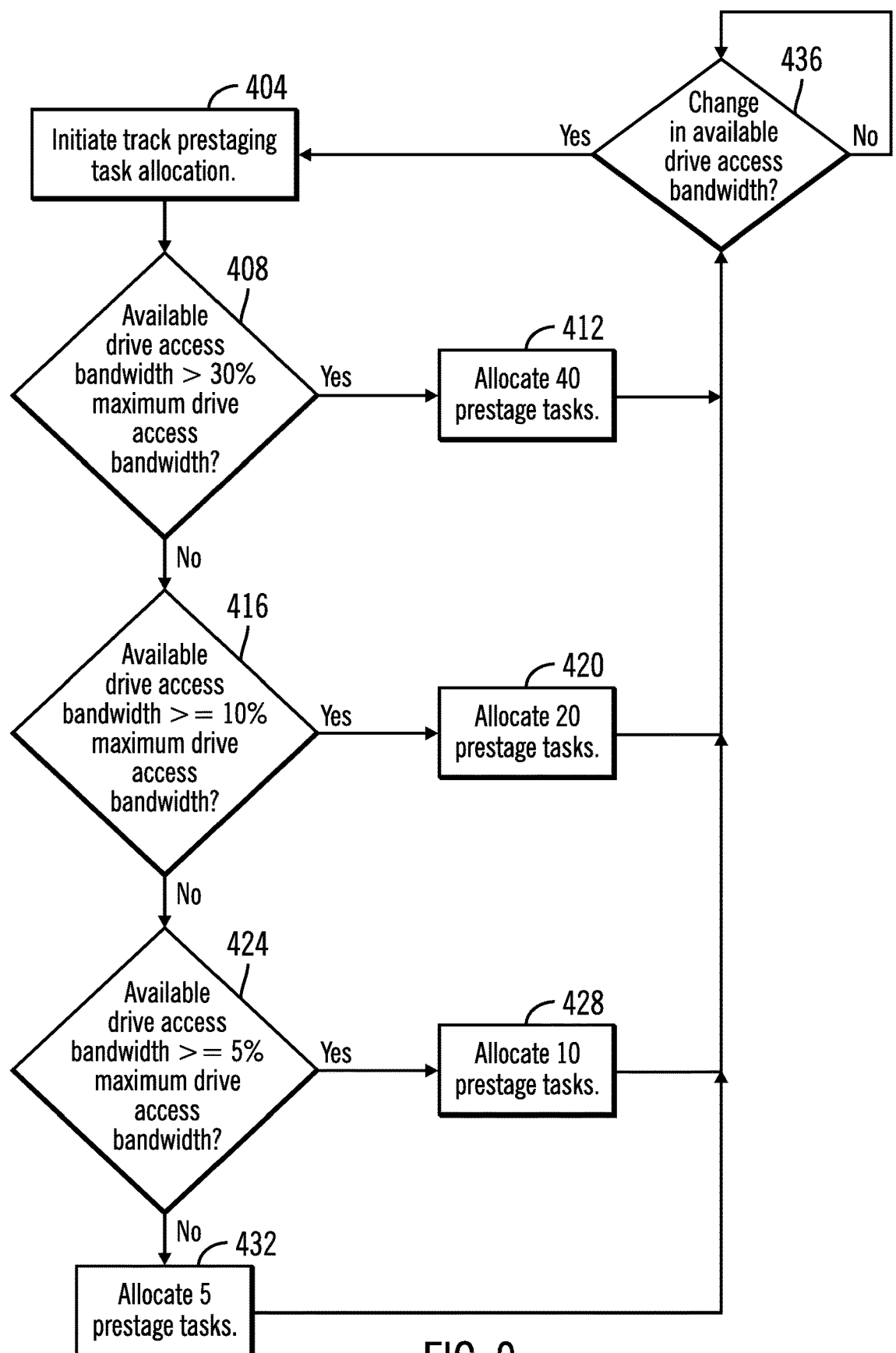
FIG. 9 illustrates an example of operations of components of the computing environment of FIG. 1, including operations of allocating prestage tasks for executing prestage requests from multiple priority prestage request queues in accordance with one aspect of the present description.
Figure 10:
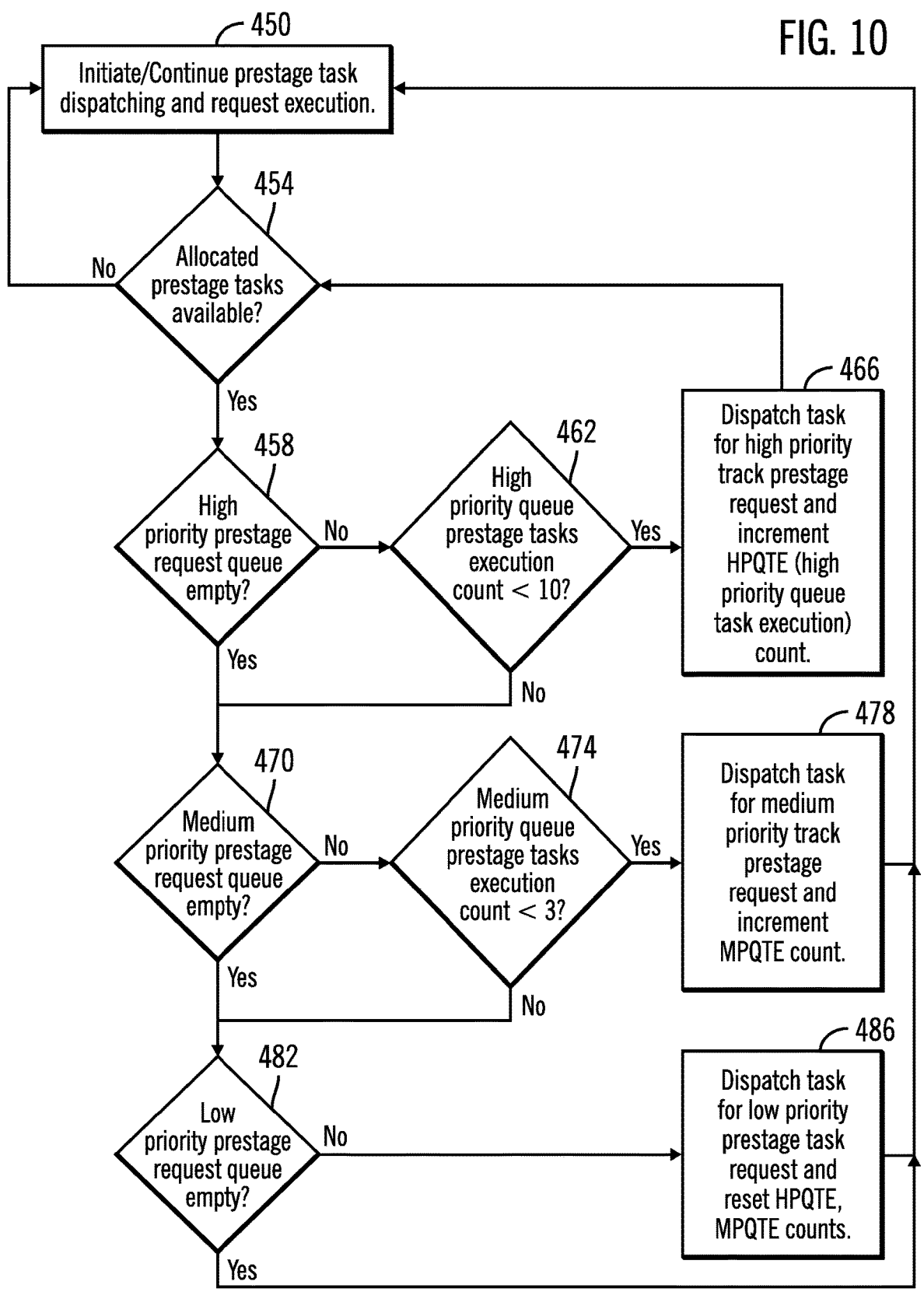
FIG. 10 illustrates an example of operations of components of the computing environment of FIG. 1, including operations of dispatching prestage tasks to execute prestage requests from multiple priority prestage request queues in accordance with one aspect of the present description.

As previously mentioned, once a request to prestage data for a track reaches the front of a priority prestage request queue 60, 64, 68, the request is executed with an available allocated task and the data of the missing sectors of the identified holes is prestaged into the slow cache tier 52 to reconstruct a whole track for destaging. FIG. 9 depicts one example of operations of the multi-tier picket fence staging logic 54 to allocate tasks for executing queued prestage requests as a function of available storage drive access bandwidth for prestaging data from the storage 10 to the slow cache tier 52. In addition, FIG. 10 depicts one example of operations of the multi-tier picket fence staging logic 54 to distribute dispatching of allocated tasks for executing queued prestage requests as a function of the priority level of the prestage request queues 60, 64, 68.

Turning first to FIG. 9, upon initiation (block 404, FIG. 9) of track prestaging task allocation, a determination is made as to whether (block 408, FIG. 9) the available drive access bandwidth exceeds a certain threshold, such as thirty percent of the maximum drive access bandwidth, for example. If so, a relatively large number of prestage tasks are allocated (block 412, FIG. 9), such as, 40 prestage tasks, in this example.

Conversely if it is determined (block 408, FIG. 9) that the available drive access bandwidth does not exceed thirty percent of the maximum drive access bandwidth, a determination is made as to whether (block 416, FIG. 9) the available drive access bandwidth is greater than or equal to a lower threshold such as ten percent, for example, (but not exceeding thirty percent) of the maximum drive access bandwidth. If so, a relatively intermediate number of prestage tasks are allocated (block 420, FIG. 9), such as 20 prestage tasks, in this example.

Alternatively, if it is determined (block 416, FIG. 9) that the available drive access bandwidth is not greater than or equal to ten percent of the maximum drive access bandwidth, a determination is made as to whether (block 424, FIG. 9) the available drive access bandwidth is greater than or equal to a still lower threshold, such as five percent, for example, (but not greater than or equal to ten percent) of the maximum drive access bandwidth. If so, a still lesser number of prestage tasks are allocated (block 428, FIG. 9), such as, 10 prestage tasks, in this example.

As another alternative, if it is determined (block 424, FIG. 9) that the available drive access bandwidth is not greater than or equal to five percent of the maximum drive access bandwidth, a still smaller number of prestage tasks are allocated (block 432, FIG. 9), such as, 5 prestage tasks in this example. Once the number of prestage tasks have been allocated, the available drive access bandwidth is periodically checked (block 436, FIG. 9). Should there be a significant change, the prestage task allocation may be reinitiated (block 404, FIG. 9) to reset the number of allocated prestage tasks at an appropriate level for a given level of available drive access bandwidth. In this manner, the multi-tier picket fence staging logic 54 allocates a quantity of tasks for executing queued prestage requests as a function of available storage drive access bandwidth for prestaging data from the storage 10 to the slow cache tier 52. In this embodiment, the greater the available drive access bandwidth, the larger the number of prestage tasks that are allocated.

The particular allocation thresholds described above and the associated quantity of prestage task allocations associated with each threshold, are provided for illustration purposes. It is appreciated that allocation thresholds and the associated quantity of task allocations associated with each threshold, may vary depending upon the particular application. It is further appreciated that prestage task allocations may be a function of other criteria in addition to or instead of available drive bandwidth, such as processor or memory resource availability, for example.

As depicted in FIG. 10, once prestage tasks have been allocated, an allocated prestage task may be dispatched to execute a prestage request which has been queued on one of the prestage request queues 60, 64, 68. In this example, for each task dispatched for the low priority prestage request queue 68, up to three tasks are dispatched for the medium priority prestage request queue 64 and up to ten tasks are dispatched for the high priority prestage request queue 60. It is appreciated that the task dispatching limits imposed on individual prestage request queues and the ratios of tasks dispatches for the respective prestage request queues, may vary, depending upon the particular application.

Accordingly, upon initiation (block 450, FIG. 10) or continuation of dispatching of the allocated prestage tasks, a determination is made as to whether (block 454, FIG. 10) any of the allocated tasks are currently available to be dispatched for execution of a prestage request which has been enqueued on a prestage request queue 60, 64, 68. If not, that is, if all allocated tasks are currently in use in the execution of prestage requests, the execution of those prestage requests continues (block 450, FIG. 10). Once the execution of a prestage request is completed by the prestaging of the requested data to the slow cache tier 52, the allocated task dispatched to execute that prestage request becomes available for dispatching to initiate execution of another prestage request enqueued on one of the prestage request queues.

Once it is determined (block 454, FIG. 10) that an allocated task has become available for dispatching to initiate execution of another prestage request which has been enqueued on a prestage request queue 60, 64, 68, a determination is made as to whether (block 458, FIG. 10) the high priority prestage request queue 60 is empty. If not, a determination is made as to whether (block 462, FIG. 10) a count referred to herein as a High Priority Queue Task Execution (HPQTE) count which keeps track of the number of allocated tasks dispatched to initiate execution of prestage requests from the high priority prestage request queue 60, has reached a limit. In the illustrated embodiment, a limit of ten dispatches of allocated tasks is placed on the dispatching of prestage requests from the high priority prestage request queue 60, before a lower priority prestage request queue 64, 68 is afforded an opportunity to use an allocated task to dispatch a prestage request enqueued on the lower priority request queues, 64, 68. It is appreciated that other limits, smaller or larger, may be employed, depending upon the particular application.

Thus, if it is determined (block 462, FIG. 10) that the limit of ten dispatches of allocated tasks for prestage requests from the high priority prestage request queue 60 has not been reached, that is, the HPQTE count remains below ten, an available task is dispatched (block 466, FIG. 10) to initiate the execution of a prestage request which has reached the front of the high priority prestage request queue 60, and the HPQTE count is incremented. Upon completion of the requested prestaging of data, the completed request is removed from the high priority prestage request queue 60 and the task dispatched to execute that request is made available (block 454, FIG. 10) for another prestage request which has reached the front of a prestage request queue.

In this manner, up to ten dispatches of allocated tasks for prestage requests from the high priority prestage request queue 60 are permitted so long as the high priority prestage request is not empty, that is, it has enqueued prestage requests awaiting dispatching on the high priority prestage request queue 60. However, once the high priority prestage request queue 60 becomes empty (block 458, FIG. 10) or the limit of ten dispatches of allocated tasks for prestage requests enqueued on the high priority prestage request queue 60 has been reached, the lower priority prestage request queues 64, 68 are afforded an opportunity to use an allocated task to dispatch a prestage request enqueued on the lower priority request queues, 64, 68.

In this manner, the high priority prestage request queue 60 does not use up all the allocated tasks. As noted above in connection with FIG. 9, different numbers of tasks may be allocated for dispatching to initiate execution of prestage requests, depending upon available drive access bandwidth. Thus, if more than ten tasks are allocated, for example, tasks can be available for dispatching for prestage requests enqueued on the lower priority queues 64, 68 once the limit of ten dispatches has been reached (block 462, FIG. 10) for the high priority prestage request queue 60. Tasks may also be available for dispatching for prestage requests enqueued on the lower priority queues 64, 68 if the high priority prestage request queue becomes empty (block 458, FIG. 10) before the limit of ten dispatches has been reached for the high priority prestage request queue 60.

Conversely, if ten or fewer tasks are allocated due to low available drive access bandwidth, there may be no allocated tasks immediately available for dispatching for prestage requests enqueued on the lower priority queues 64, 68. However, once the limit of ten dispatches for the high priority prestage request queue 60 is reached or the high priority queue 60 no longer has prestage requests enqueued and awaiting dispatching, tasks may be dispatched for the lower priority queues 64, 68 once additional tasks become available. Thus, even with a low allocation of tasks due to low available drive access bandwidth, allocated tasks will eventually become available for dispatching for prestage requests enqueued on the lower priority queues 64, 68 once the limit of ten dispatches has been reached (block 462, FIG. 10), for the high priority prestage request queue 60 or the high priority prestage request queue becomes empty (block 458, FIG. 10), which ever occurs first.

Accordingly, once the high priority prestage request queue 60 becomes empty (block 458, FIG. 10) or the limit of ten dispatches for prestage requests enqueued on the high priority prestage request queue 60 is reached (block 462, FIG. 10), a determination is made as to whether (block 470, FIG. 10) the medium priority prestage request queue 64 is empty. If not, a determination is made as to whether (block 474, FIG. 10) a count referred to herein as a Medium Priority Queue Task Execution (MPQTE) count which keeps track of the number of allocated tasks dispatched to initiate execution of prestage requests from the medium priority prestage request queue 64. In the illustrated embodiment, a limit of three dispatches of allocated tasks is placed on the dispatching of prestage requests from the medium priority prestage request queue 64, before the low priority prestage request queue 68 is afforded an opportunity to use an available allocated task to dispatch a prestage request enqueued on the low priority request queue 68. It is appreciated that other limits, smaller or larger, may be employed, depending upon the particular application.

Thus, if it is determined (block 474, FIG. 10) that the limit of three dispatches of allocated tasks for prestage requests from the medium priority prestage request queue 64 has not been reached, that is, the MPQTE count remains below three, an available task is dispatched (block 478, FIG. 10) to initiate the execution of a prestage request which has reached the front of the medium priority prestage request queue 64, and the MPQTE count is incremented. Upon completion of the requested prestaging of data, the completed request is removed from the medium priority prestage request queue 64 and the task dispatched to execute that request is made available (block 454, FIG. 10) for another prestage request which has reached the front of a prestage request queue.

In this manner, up to three dispatches of allocated tasks for prestage requests from the medium priority prestage request queue 64 are permitted so long as the medium priority prestage request is not empty, that is, it has enqueued prestage requests awaiting dispatching on the medium priority prestage request queue 64. However, once the medium priority prestage request queue 64 becomes empty (block 470, FIG. 10) or the limit of three dispatches of allocated tasks for prestage requests enqueued on the medium priority prestage request queue 64 has been reached, the low priority prestage request queue 68 is afforded an opportunity to use an available allocated task to dispatch a prestage request enqueued on the low priority request queue 68.

As a result, the medium priority prestage request queue 64 does not use up all the available allocated tasks remaining after the high priority limit has been reached or the high priority prestage request queue 60 has been emptied. As noted above in connection with FIG. 9, different numbers of tasks may be allocated for dispatching to initiate execution of prestage requests, depending upon available drive access bandwidth. Thus, if more than thirteen tasks are allocated, and 10 tasks are dispatched for the high priority queue 60 and three tasks are dispatched for the medium priority queue 64, for example, tasks can be available for dispatching for prestage requests enqueued on the lower priority queue 68 once the limit of ten dispatches has been reached (block 462, FIG. 10) for the high priority prestage request queue 60 and the limit of three dispatches has been reached (block 474, FIG. 10) for the medium priority prestage request queue. Also, tasks can be available for dispatching for prestage requests enqueued on the low priority queue 68 if the high priority prestage request queue 60 becomes empty (block 458, FIG. 10) before the limit of ten dispatches has been reached for the high priority prestage request queue 60 or if the medium priority prestage request queue 64 becomes empty (block 470, FIG. 10) before the limit of three dispatches has been reached for the medium priority prestage request queue 64.

Conversely, if less than thirteen tasks are allocated due to low available drive access bandwidth, there may be no tasks immediately available for dispatching for prestage requests enqueued on the low priority queue 68. However, once the limit of ten dispatches for the high priority prestage request queue 60 is reached or the high priority queue 60 no longer has prestage requests enqueued and awaiting dispatching, and the limit of three dispatches for the medium priority prestage request queue 64 is reached or the high priority queue 60 no longer has prestage requests enqueued and awaiting dispatching, a task may be dispatched for the low priority queue once additional tasks become available. Thus, even with a low allocation of tasks due to low available drive access bandwidth, allocated tasks will eventually become available for dispatching for prestage requests enqueued on the low priority queue 68 once the limits for dispatches have been reached for the higher priority queues 60, 64 or one of the higher priority queues 60, 64 becomes empty before the associated limit is reached.

Accordingly, once the medium priority prestage request queue 64 becomes empty (block 470, FIG. 10) or the limit of three dispatches for prestage requests enqueued on the high priority prestage request queue 60 is reached (block 474, FIG. 10), a determination is made as to whether (block 482, FIG. 10) the low priority prestage request queue 68 is empty. If not, an available task is dispatched (block 486, FIG. 10) to initiate the execution of a prestage request which has reached the front of the low priority prestage request queue 68. In addition the HPQTE count is reset to provide the high priority prestage request queue 60 a new limit of ten dispatches since the medium and low priority queues 64, 68 were already afforded an opportunity to dispatch tasks within their respective limits. In a similar manner, the MPQTE count is reset to provide the medium priority prestage request queue 60 a new limit of three dispatches since the low priority queue 68 was afforded an opportunity to dispatch a task as described above. Upon completion of the requested prestaging of data, the completed request is removed from the low priority prestage request queue 68 and the task dispatched to execute that request is made available (block 454, FIG. 10) for another prestage request which has reached the front of a prestage request queue.

In this manner, for each task dispatched for the low priority prestage request queue 68, up to three tasks are dispatched for the medium priority prestage request queue 64 and up to ten tasks are dispatched for the high priority prestage request queue 60. It is appreciated that other dispatching limits, smaller or larger, may be employed, depending upon the particular application.

Figure 12:
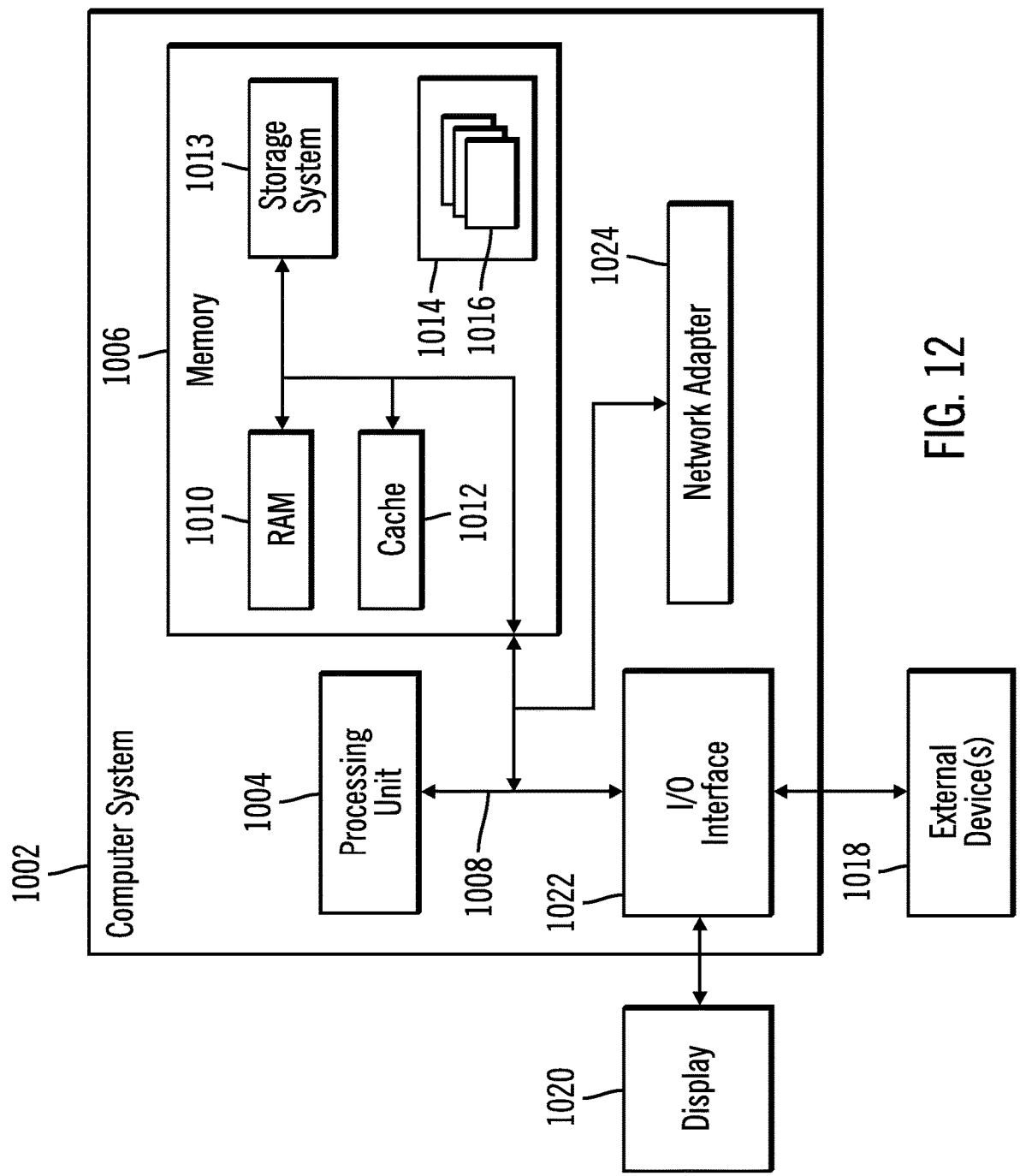
FIG. 12 illustrates a computer embodiment employing picket fence staging in a multi-tier cache in a data storage system in accordance with the present description.

The computational components of the figures may each be implemented in one or more computer systems, such as the computer system 1002 shown in FIG. 12. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product configured for use with a computer system having a host, and a data storage system having storage, wherein the computer program product comprises a computer readable storage medium having program instructions embodied therewith, the program instructions executable by a processor of the computer system to cause computer system operations, the computer system operations comprising:

storing in storage, a track having a set of sectors of data;

caching update data for the track in a fast cache tier of a multi-tier cache in a first track write caching operation which includes caching update data for a first subset of sectors of the track in the fast cache tier and omitting caching data for a second subset of sectors of the track in the fast cache tier to define upon completion of the first track write caching operation, a number of track holes equal to zero or more track holes of the track in the fast cache tier in which a track hole corresponds to one or more contiguous sectors of the second subset of sectors of the track for which data caching is omitted during the first track write caching operation, determining the number of track holes defined by the second subset of sectors omitted from the first track write caching operation; and queuing prestage requests in one of a plurality of prestage request queues as a function of the number of track holes determined to be present in the second subset of sectors absent from the fast cache tier, wherein each prestage request when executed prestages read data from storage to a slow cache tier of the multi-tier cache, for one or more sectors for the second subset of sectors identified by one or more track holes.

2. The computer program product of claim 1 wherein the plurality of prestage request queues includes a first prestage request queue for queuing prestage requests having a first priority, a second prestage request queue for queuing prestage requests having a second priority lower than the first priority, and a third prestage request queue for queuing prestage requests having a third priority lower than the second priority.

3. The computer program product of claim 2 wherein prestage requests are queued in the first prestage request queue if the number of track holes determined to be present in second subset of sectors absent from the fast cache tier, is in a first range of number of holes, prestage requests are queued in the second prestage request queue if the number of track holes determined to be present in second subset of sectors absent from the fast cache tier, is in a second range of number of holes, and prestage requests are queued in the third prestage request queue if the number of track holes determined to be present in second subset of sectors absent from the fast cache tier, is in a third range of number of holes.

4. The computer program product of claim 2 wherein the operations further comprise allocating tasks for execution of prestage requests queued on the first, second and third prestage request queues as a function of available storage drive access bandwidth for prestaging tracks stored in the storage to the slow cache tier.

5. The computer program product of claim 2 wherein the operations further comprise dispatching allocated tasks to execute prestage requests queued on selected prestage request queues of the first, second and third prestage request queues as a function of the first, second and third priority associated with first, second and third prestage request queues, respectively.

6. The computer program product of claim 2 wherein dispatching allocated tasks includes dispatching allocated tasks as a function of first, second and third limits associated with the first, second and third prestage request queues wherein the first limit associated with the first prestage request queue having the first priority is higher than the second limit associated with the second prestage request queue having the second priority and wherein the second limit associated with the second prestage request queue having the second priority is higher than the third limit associated with the third prestage request queue having the third priority.

7. A method, comprising:
    storing in storage, a track having a set of sectors of data;
    caching update data for the track in a fast cache tier of a multi-tier cache in a first track write caching operation which includes caching update data for a first subset of sectors of the track in the fast cache tier and omitting caching data for a second subset of sectors of the track in the fast cache tier to define upon completion of the first track write caching operation, a number of track holes equal to zero or more track holes of the track in the fast cache tier in which a track hole corresponds to one or more contiguous sectors of the second subset of sectors of the track for which data caching is omitted during the first track write caching operation,
    determining the number of track holes defined by the second subset of sectors omitted from the first track write caching operation; and
    queuing prestage requests in one of a plurality of prestage request queues as a function of the number of track holes determined to be present in the second subset of sectors absent from the fast cache tier, wherein each prestage request when executed prestages read data from storage to a slow cache tier of the multi-tier cache, for one or more sectors for the second subset of sectors identified by one or more track holes.

8. The method of claim 7 wherein the plurality of prestage request queues includes a first prestage request queue for queuing prestage requests having a first priority, a second prestage request queue for queuing prestage requests having a second priority lower than the first priority, and a third prestage request queue for queuing prestage requests having a third priority lower than the second priority.

9. The method of claim 8 wherein prestage requests are queued in the first prestage request queue if the number of track holes determined to be present in second subset of sectors absent from the fast cache tier, is in a first range of number of holes, prestage requests are queued in the second prestage request queue if the number of track holes determined to be present in second subset of sectors absent from the fast cache tier, is in a second range of number of holes, and prestage requests are queued in the third prestage request queue if the number of track holes determined to be present in second subset of sectors absent from the fast cache tier, is in a third range of number of holes.

10. The method of claim 8 further comprising allocating tasks for execution of prestage requests queued on the first, second and third prestage request queues as a function of available storage drive access bandwidth for prestaging tracks stored in the storage to the slow cache tier.

11. The method of claim 8 further comprising dispatching allocated tasks to execute prestage requests queued on selected prestage request queues of the first, second and third prestage request queues as a function of the first, second and third priority associated with first, second and third prestage request queues, respectively.

12. The method of claim 8 wherein dispatching allocated tasks includes dispatching allocated tasks as a function of first, second and third limits associated with the first, second and third prestage request queues wherein the first limit associated with the first prestage request queue having the first priority is higher than the second limit associated with the second prestage request queue having the second priority and wherein the second limit associated with the second prestage request queue having the second priority is higher than the third limit associated with the third prestage request queue having the third priority.

13. A computer system, comprising:
    a host having a processor,
    a data storage system having a processor, a memory having a plurality of prestage request queues, storage and a multi-tier cache having a fast cache tier and a slow cache tier; and
    a computer program product comprising a computer readable storage medium having program instructions embodied therewith, the program instructions executable by a processor of the computer system to cause computer system operations, the computer system operations comprising:
        storing in storage, a track having a set of sectors of data;
        caching update data for the track in the fast cache tier of the multi-tier cache in a first track write caching operation which includes caching update data for a first subset of sectors of the track in the fast cache tier and omitting caching data for a second subset of sectors of the track in the fast cache tier to define upon completion of the first track write caching operation, a number of track holes equal to zero or more track holes of the track in the fast cache tier in which a track hole corresponds to one or more contiguous sectors of the second subset of sectors of the track for which data caching is omitted during the first track write caching operation,
        determining the number of track holes defined by the second subset of sectors omitted from the first track write caching operation; and
        queuing prestage requests in one of the plurality of prestage request queues as a function of the number of track holes determined to be present in the second subset of sectors absent from the fast cache tier, wherein each prestage request when executed prestages read data from storage to the slow cache tier of the multi-tier cache, for one or more sectors for the second subset of sectors identified by one or more track holes.

14. The computer system of claim 13 wherein the plurality of prestage request queues includes a first prestage request queue for queuing prestage requests having a first priority, a second prestage request queue for queuing prestage requests having a second priority lower than the first priority, and a third prestage request queue for queuing prestage requests having a third priority lower than the second priority.

15. The computer system of claim 14 wherein prestage requests are queued in the first prestage request queue if the number of track holes determined to be present in second subset of sectors absent from the fast cache tier, is in a first range of number of holes, prestage requests are queued in the second prestage request queue if the number of track holes determined to be present in second subset of sectors absent from the fast cache tier, is in a second range of number of holes, and prestage requests are queued in the third prestage request queue if the number of track holes determined to be present in second subset of sectors absent from the fast cache tier, is in a third range of number of holes.

16. The computer system of claim 14 wherein the operations further comprise allocating tasks for execution of prestage requests queued on the first, second and third prestage request queues as a function of available storage drive access bandwidth for prestaging tracks stored in the storage to the slow cache tier.

17. The computer system of claim 14 wherein the operations further comprise dispatching allocated tasks to execute prestage requests queued on selected prestage request queues of the first, second and third prestage request queues as a function of the first, second and third priority associated with first, second and third prestage request queues, respectively.

18. The computer system of claim 14 wherein dispatching allocated tasks includes dispatching allocated tasks as a function of first, second and third limits associated with the first, second and third prestage request queues wherein the first limit associated with the first prestage request queue having the first priority is higher than the second limit associated with the second prestage request queue having the second priority and wherein the second limit associated with the second prestage request queue having the second priority is higher than the third limit associated with the third prestage request queue having the third priority.

* * * * *